US008554012B2

(12) United States Patent
Du et al.

(10) Patent No.: US 8,554,012 B2
(45) Date of Patent: Oct. 8, 2013

(54) IMAGE PROCESSING APPARATUS AND IMAGE PROCESSING METHOD FOR CORRECTING DISTORTION IN PHOTOGRAPHED IMAGE

(75) Inventors: Jiyun Du, Ishikawa (JP); Satoshi Miyamoto, Ishikawa (JP); Nobuhisa Yamazaki, Ishikawa (JP)

(73) Assignee: PFU Limited, Ishikawa (JP)

( * ) Notice: Subject to any disclaimer, the term of this patent is extended or adjusted under 35 U.S.C. 154(b) by 1073 days.

(21) Appl. No.: 12/551,407

(22) Filed: Aug. 31, 2009

(65) Prior Publication Data

US 2010/0135595 A1 Jun. 3, 2010

(30) Foreign Application Priority Data

Dec. 2, 2008 (JP) .................................. 2008-307915

(51) Int. Cl.
*G06K 9/40* (2006.01)
*G06K 9/00* (2006.01)

(52) U.S. Cl.
USPC ............ 382/275; 382/112; 382/266; 382/254

(58) Field of Classification Search
USPC ......... 382/128, 255, 275, 305, 308, 266, 254, 382/242, 112, 199, 167, 171, 263, 260; 358/1.15, 1.9, 406, 504, 449, 518, 520, 358/523; 348/606, 612, 625–631
See application file for complete search history.

(56) References Cited

U.S. PATENT DOCUMENTS

| | | | | |
|---|---|---|---|---|
| 5,442,459 | A * | 8/1995 | Gahang | 358/426.02 |
| 6,281,931 | B1 * | 8/2001 | Tsao et al. | 348/247 |
| 6,483,948 | B1 * | 11/2002 | Spink et al. | 382/255 |
| 6,515,771 | B1 * | 2/2003 | Sato | 358/3.26 |

(Continued)

FOREIGN PATENT DOCUMENTS

| | | |
|---|---|---|
| JP | 10-150532 A | 6/1998 |
| JP | 3175250 B2 | 4/2001 |

(Continued)

OTHER PUBLICATIONS

Breeuwer et al. "Detection and Correction of Geometric distortion in 3D CT/MR images" Paper CARS (1999) Paris France, pp. 1-5.*

(Continued)

*Primary Examiner* — Chan S Park
*Assistant Examiner* — Mia M Thomas
(74) *Attorney, Agent, or Firm* — Lowe, Hauptman & Ham

(57) ABSTRACT

An image processing apparatus including an image photographing unit, and a control unit, wherein the control unit includes a document image acquiring unit that acquires a document image including at least an image of a document, a contour extracting unit that extracts a contour of the document from the document image, the extracting the contour being performed based on luminance, a distortion position detecting unit that detects a contour straight line located at a location where a distance between the contour and a center point of a rectangle having the minimum area surrounding the contour is shortest, the contour straight line being detected as a distortion position in the document, the contour straight line being located on the contour, and a corrected image generating unit that performs a geometric correction on the document image to extend the contour to a correction reference line determined from the distortion position, and generates a corrected image having the distortion in the document image corrected.

12 Claims, 13 Drawing Sheets

(56) References Cited

U.S. PATENT DOCUMENTS

| | | | |
|---|---|---|---|
| 6,606,421 B1* | 8/2003 | Shaked et al. | 382/275 |
| 8,285,043 B2* | 10/2012 | Matsui | 382/171 |
| 8,314,980 B2* | 11/2012 | Makino et al. | 358/520 |
| 8,339,656 B2* | 12/2012 | Komiya | 358/1.18 |
| 2002/0041383 A1* | 4/2002 | Lewis et al. | 358/1.9 |
| 2002/0196472 A1* | 12/2002 | Enomoto | 358/3.26 |
| 2003/0174904 A1* | 9/2003 | Yamaai | 382/292 |
| 2004/0240750 A1* | 12/2004 | Chauville et al. | 382/275 |
| 2006/0193533 A1* | 8/2006 | Araki et al. | 382/275 |
| 2007/0171288 A1 | 7/2007 | Inoue et al. | |
| 2008/0085041 A1* | 4/2008 | Breeuwer | 382/128 |
| 2008/0137157 A1* | 6/2008 | Bannai | 358/497 |
| 2009/0067745 A1* | 3/2009 | Cellier | 382/275 |
| 2009/0161952 A1* | 6/2009 | Matsui | 382/171 |
| 2010/0135595 A1* | 6/2010 | Du et al. | 382/275 |

FOREIGN PATENT DOCUMENTS

| | | |
|---|---|---|
| JP | 3433624 B2 | 5/2003 |
| JP | 2004228759 A | 8/2004 |
| JP | 2005045723 A | 2/2005 |
| JP | 2005198334 A | 7/2005 |
| JP | 2005316550 A | 11/2005 |
| JP | 2006229685 A | 8/2006 |
| JP | 2007324655 A | 12/2007 |
| WO | 2005093653 A1 | 10/2005 |

OTHER PUBLICATIONS

Decision of a Patent Grant issued Nov. 27, 2012 in Japanese Application No. 2008-307915, 2 pages.

* cited by examiner

IMAGE PROCESSING APPARATUS AND IMAGE PROCESSING METHOD FOR CORRECTING DISTORTION IN PHOTOGRAPHED IMAGE

RELATED APPLICATIONS

The present application is based on, and claims priority from, Japan Application Number 2008-307915, filed Dec. 2, 2008, the disclosure of which is hereby incorporated by reference herein in its entirety.

BACKGROUND OF THE INVENTION

1. Field of the Invention

The present invention relates to an image processing apparatus and an image processing method.

2. Description of the Related Art

In recent years, two-dimensional image sensors serving as cameras and the likes mounted on portable devices such as digital cameras and portable telephone devices are becoming higher in quality and performance, and lower in price. Such two-dimensional image sensors are normally used for taking photographs. In line with today's trend of higher image quality and higher performance, however, the two-dimensional image sensors might be used to pick up images of documents such as paper documents, newspapers, and magazines, and store the text information contained in the document images as document image data.

Document image data that is generated by taking an image of a document using a two-dimensional image sensor and is formed with several sets of pixel data should preferably present easy-to-read text information contained in each document as an image pickup object. However, a camera formed with a two-dimensional image sensor or the like is not designed to set conditions such as the position of the user, the lighting environment, and the degree of distortion in the document as the image pickup object. Therefore, the generated document image data might not be easy to read.

To counter this problem, a technique for measuring and correcting the degree of distortion of each document as an image pickup object has been suggested.

For example, an image reading device disclosed in JP-A-10-150532 is designed to increase the reading accuracy about one-point-bound documents, and widen the range of use. The image reading device determines whether a document placed on a platen is a one-point-bound document that is bound at one corner and has one or more pages turned over. Based on an image picked up from above and an image picked up from a side with the use of an image pickup unit of an optical system, the image reading device measures the curvature of the document face that is the upper face of a paper sheet in the one-point-bound document. The image reading device then corrects the read image of the document face in accordance with the measured curvature.

An image reading device disclosed in Japanese Patent No. 3433624 corrects distortions in a read image caused due to a partially hidden document face, and increases the read accuracy when reading a one-point-bound document. The height distribution of the document face of a document placed on the platen is measured in the main scan direction and the sub scan direction, from an image picked up from above and an image picked up from a side with the use of an image pickup unit of an optical system or the like. The degree of curvature in the document face in each direction can be determined through the measurement. Based on the degree of curvature, the image reading device determines whether the document placed on the platen is a one-point-bound document that has sheets of paper bound at one corner and has one or more of the sheets turned over. Based on the height distribution of the document face in the main scan direction and the sub scan direction, the image reading device detects a sheet overlapping region in the document face that is the upper face of a paper sheet of the one-point-bound document. The image reading device then performs a correction to erase the portions corresponding to the overlapping region among the read images of the document face. The image reading device disclosed in Japanese patent No. 3433624 also uses an AF mechanism of an optical system or the like to make a focus adjustment when scanning the document in accordance with the height distribution in the document face. In this manner, the image reading device performs a height interpolation.

A document reading device disclosed in Japanese patent No. 3175250 corrects row-direction curvature. To do so, the document reading device reads from above a document facing upward, and detects the document shape by a triangular ranging method using a curvature sensor board or the like that includes an IR light emitting device and a light receiving device of an optical system. In accordance with the shape detection output, the document reading device corrects the row-direction curvature of the read document.

In the conventional techniques (JP-A-10-150532, Japanese Patent No. 3433624 and No. 3175250 and the like), the degree of distortion of a document as an image pickup object is measured and corrected with the use of an optical system. However, when the type of document is determined or the degree of distortion of the document is measured, it is necessary to prepare an image picked up from above and an image picked up from a side. As a result, the work load in the image processing becomes larger, and the efficiency becomes poorer. Also, in the conventional techniques (JP-A-10-150532, Japanese Patent No. 3433624 and No. 3175250 and the like), there is a problem with correction accuracy, since a verifying operation is not performed to determine whether the degree of distortion of each document has been accurately measured. Also, in the conventional techniques (JP-A-10-150532, Japanese Patent No. 3433624 and No. 3175250 and the like), fixed tools and devices are required to measure the degree of distortion. As a result, the devices become large in size, and the portability and versatility become poorer.

More specifically, in the image reading devices according to JP-A-10-150532 and Japanese Patent No. 3433624, the type of document is determined, and the degree of distortion in the document placed on the platen is measured, based not only on an image of the document picked up from above with the use of an optical system (such as an image pickup unit) but also on an image of the document picked up from a side by projecting the image onto a projection plate extending along the rear end of the platen or a projection plate extending forward or backward in the right half of the platen. Therefore, there is the need to perform various operations, such as an operation to determine whether the image picked up from above contains an image of a staple, an operation to determine whether the document is a book-type document or a sheet-type document based on the degree of curvature (the height distribution) obtained from the image picked up from a side, and an operation to correct the distortions in the images so as to achieve a uniform height based on the height distribution obtained from the image picked up from a side. Because of these operations, the work load in the image processing becomes larger. Also, there is the problem that increasing the correction accuracy by verifying the measured height distribution of the document is not considered prior to the correcting operation. Since fixed tools (such as the platen and the projection plate) and devices (such as an image pickup unit and an AF mechanism) are required, the device becomes too large in size.

The document reading device according to Japanese Patent No. 3175250 uses an optical system (such as a curvature sensor board) to measure the height of the document face according to a triangular ranging method. By the triangular ranging method, a distance is measured by receiving light that is emitted from an IR light emitting device, is reflected by the document face, and is received by a light receiving device. The document reading device corrects the row-direction curvature of the document in accordance with shape data interpolated based on the measured height. Accordingly, a correcting operation can be performed based only on the image picked up from above. However, increasing the correction accuracy by verifying the row-direction curvature of the document measured by detecting the document shape is not considered prior to the correcting operation. Also, since fixed tools (such as a board having the platen and a photo sensor arranged thereon) and devices (such as a reading unit including a curvature sensor board, an IR light emitting device, and a light receiving device) are required, the device becomes too large in size.

SUMMARY OF THE INVENTION

It is an object of the present invention to at least partially solve the problems in the conventional technology.

An image processing apparatus according to one aspect of the present invention includes an image photographing unit, and a control unit. The control unit includes a document image acquiring unit that acquires a document image including at least an image of a document photographed by the image photographing unit, a contour extracting unit that extracts a contour of the document from the document image acquired by the document image acquiring unit, the extracting the contour being performed based on luminance, a distortion position detecting unit that detects a contour straight line located at a location where a distance between the contour extracted by the contour extracting unit and a center point of a rectangle having the minimum area surrounding the contour is shortest, the contour straight line being detected as a distortion position in the document, the contour straight line being located on the contour, and a corrected image generating unit that performs a geometric correction on the document image to extend the contour to a correction reference line determined from the distortion position detected by the distortion position detecting unit, and generates a corrected image having the distortion in the document image corrected.

An image processing method executed by an image processing apparatus according to another aspect of the present invention includes an image photographing unit, and a control unit. The method includes a document image acquiring step of acquiring a document image including at least an image of a document photographed by the image photographing unit, a contour extracting step of extracting a contour of the document from the document image acquired at the document image acquiring step, the extracting the contour being performed based on luminance, a distortion position detecting step of detecting a contour straight line located at a location where a distance between the contour extracted at the contour extracting step and a center point of a rectangle having the minimum area surrounding the contour is shortest, the contour straight line being detected as a distortion position in the document, the contour straight line being located on the contour, and a corrected image generating step of performing a geometric correction on the document image to extend the contour to a correction reference line determined from the distortion position detected at the distortion position detecting step, and generating a corrected image having the distortion in the document image corrected, wherein the steps are executed by the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an image processing apparatus and an image processing method, and, a program according to the present invention will be explained below in detail based on the drawings. The embodiment does not limit the invention. A configuration and processing of the present invention are explained in detail below.

Configuration of the Image Processing Apparatus 1

Figure 1:
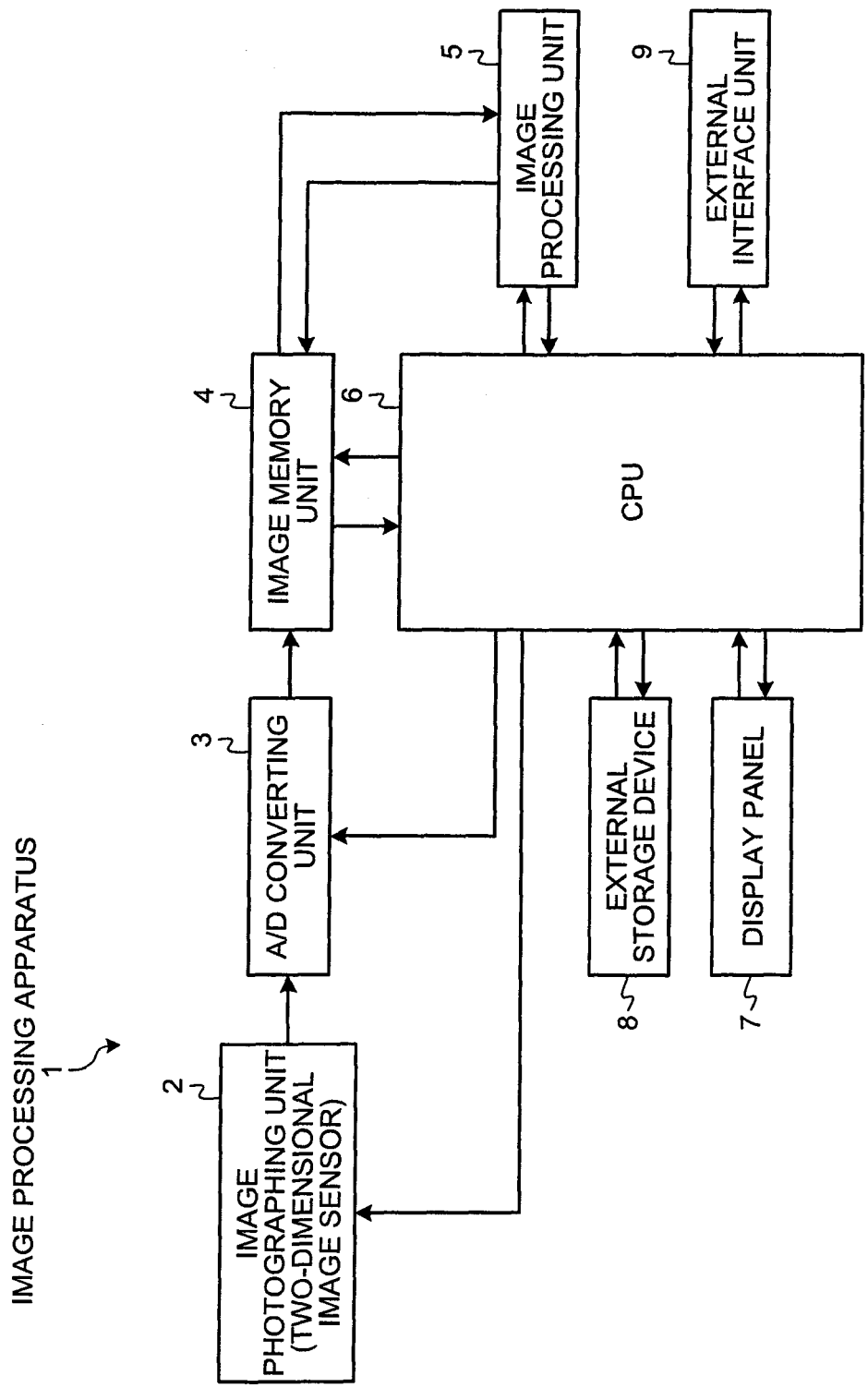
FIG. 1 is a block diagram showing one example of a configuration of an image processing apparatus 1 according to the present invention.
Figure 2:
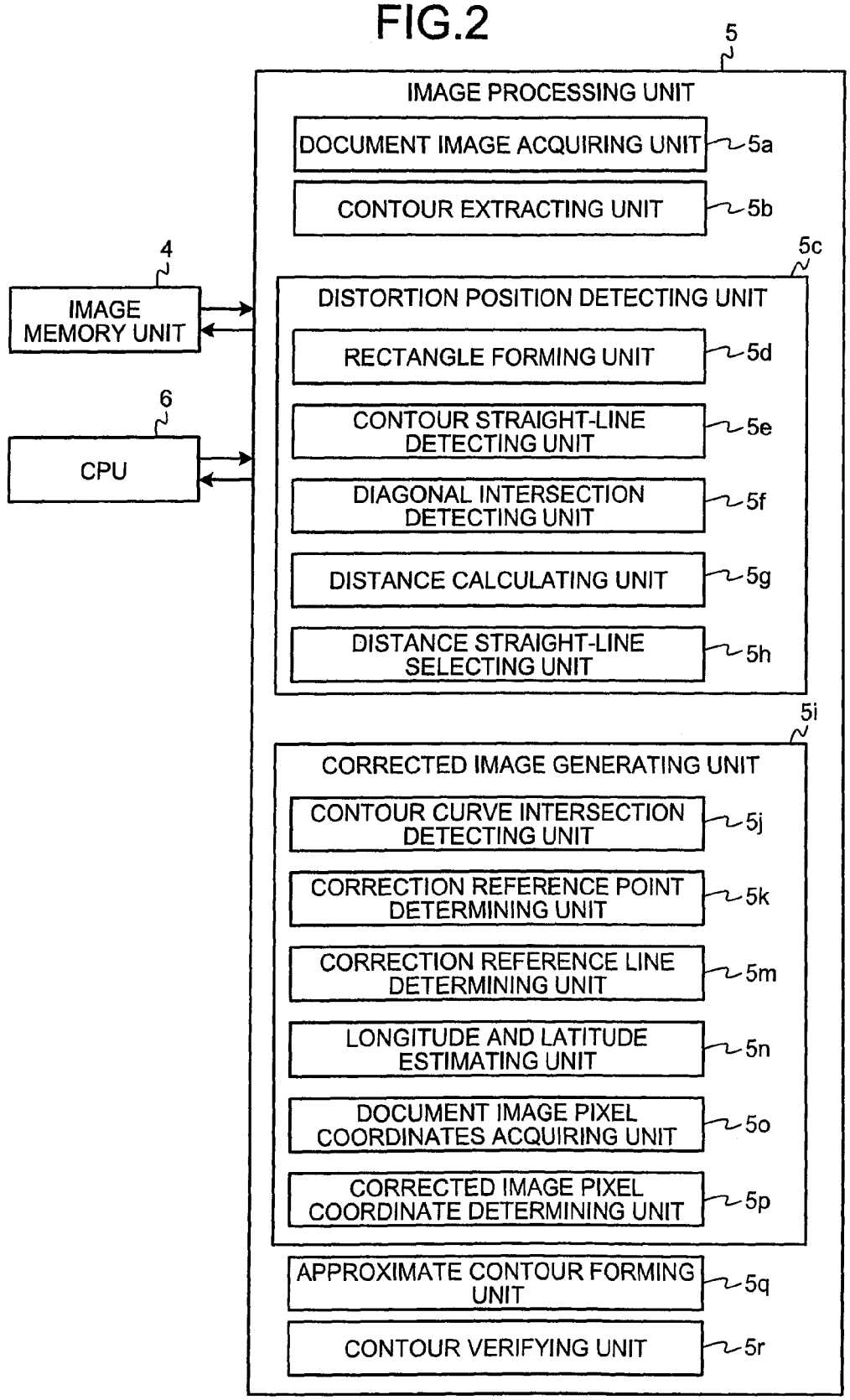
FIG. 2 is a block diagram showing one example of a configuration of an image processing unit 5 of the image processing apparatus 1 according to the present invention.

First, the configuration of the image processing apparatus 1 will be explained in detail below. As schematically shown in FIG. 1 and FIG. 2, the image processing apparatus 1 includes an image photographing unit (a two-dimensional image sensor) 2, an A-D converting unit 3, an image memory unit 4, an image processing unit 5, a CPU 6, a display panel 7, an external storage device 8, and an external interface unit 9. In the present invention, the A-D converting unit 3, the image processing unit 5, and the CPU 6 function as the control unit of the image processing apparatus 1. The image memory unit 4 and the external storage device 8 function as the storage unit of the image processing apparatus 1.

As shown in FIG. 1, the image photographing unit 2 is an image sensor that picks up an image of a document, a landscape, or a person as an object to be imaged. The image photographing unit 2 is formed with image pickup devices arranged in the vertical direction (the y-direction) and the horizontal direction (the x-direction). The image sensors have RGB filters. Through one-time image pickup operation or one-time exposure, the image photographing unit 2 outputs analog values corresponding to the image pickup devices and the RGB colors.

As shown in FIG. 1, the A-D converting unit 3 generates image data in response to the image pickup operation by the image photographing unit 2. The A-D converting unit 3 is connected to the image photographing unit 2, and converts the analog values of the image data output from the image photographing unit 2 into digital values. More specifically, when the image photographing unit 2 picks up an image of a document, for example, the A-D converting unit 3 converts each analog value output from the image photographing unit 2 into a digital value, and generates sets of pixel data that form document image data. In this manner, the A-D converting unit 3 generates document image data based on a document image containing the document. Here, each set of pixel data is formed with RGB values, and the document image data is multicolor image data.

As shown in FIG. 1, the image memory unit 4 stores image data. The image memory unit 4 is connected to the A-D converting unit 3, so as to store image data converted into digital values by the A-D converting unit 3. More specifically, the image memory unit 4 can store document image data converted into digital values by the A-D converting unit 3. The image memory unit 4 also stores image data processed by the image processing unit 5. More specifically, the image memory unit 4 can store document image data processed by the image processing unit 5.

As shown in FIG. 1, the image processing unit 5 processes image data. The image processing unit 5 is connected to the image memory unit 4, and processes the image data stored in the image memory unit 4. More specifically, the image processing unit 5 can process the document image data stored in the image memory unit 4. The image processing unit 5 is also connected to the CPU 6, and is controlled by the CPU 6.

As shown in FIG. 2, the image processing unit 5 is connected to the image memory unit 4 and the CPU 6, and functions as a document image acquiring unit 5*a*, a contour extracting unit 5*b*, a distortion position detecting unit 5*c*, a corrected image generating unit 5*i*, an approximate contour forming unit 5*q*, and a contour verifying unit 5*r*. The distortion position detecting unit 5*c* further includes a rectangle forming unit 5*d*, a contour straight-line detecting unit 5*e*, a diagonal intersection detecting unit 5*f*, a distance calculating unit 5*g*, and a distance straight-line selecting unit 5*h*. The corrected image generating unit 5*i* further includes a contour curve intersection detecting unit 5*j*, a correction reference point determining unit 5*k*, a correction reference line determining unit 5*m*, a longitude and latitude estimating unit 5*n*, a document image pixel coordinate acquiring unit 5*o*, and a corrected image pixel coordinate determining unit 5*p*. The approximate contour forming unit 5*q* and the contour verifying unit 5*r* are used to determine whether the contour extracting unit 5*b* has accurately extracted a contour.

Out of these units, the document image acquiring unit 5*a* acquires a document image including at least an image of a document photographed by the image photographing unit 2.

The contour extracting unit 5*b* extracts a contour of the document from the document image acquired by the document image acquiring unit 5*a*, the extracting the contour being performed based on luminance.

The distortion position detecting unit 5*c* detects a contour straight line located at a location where a distance between the contour extracted by the contour extracting unit 5*b* and a center point of a rectangle having the minimum area surrounding the contour is shortest, the contour straight line being detected as a distortion position in the document, the contour straight line being located on the contour. The distortion position detecting unit 5*c* may detect the contour straight line as the distortion position of the document located at a position where the distance between the contour and the center point of the rectangle having the minimum area surrounding the verified contour is shortest, when the later described contour verifying unit 5*r* determines that the difference is smaller than the predetermined threshold value and verifies that the contour extracting unit 5*b* accurately extracts the contour. The distortion position may include a bound position when the document is bound with a binding tool.

Here, the distortion position detecting unit 5*c* further includes the rectangle forming unit 5*d*, the contour straight-line detecting unit 5*e*, the diagonal intersection detecting unit 5*f*, the distance calculating unit 5*g*, and the distance straight-line selecting unit 5*h*. The distortion position detecting unit 5*c* detects the contour straight line crossing the distance straight line selected by the later described distance straight line selecting unit 5*h* at the first intersection, the contour straight line being detected as the distortion position of the document.

Out of these units, the rectangle forming unit 5*d* forms the rectangle having the minimum area surrounding the contour extracted by the contour extracting unit 5*b*.

The contour straight-line detecting unit 5*e* divides the rectangle formed by the rectangle forming unit 5*d* into four quadrants, detects a straight line portion on the contour from the respective quadrants, and detects the contour straight line crossing adjacent facing sides of the rectangle from the straight line portion.

The diagonal intersection detecting unit 5*f* detects a first intersection of a diagonal line of the rectangle with the contour straight line detected from the quadrants by the contour straight line detecting unit 5*e*.

The distance calculating unit 5*g* calculates a distance between the center point of the rectangle and the first intersection detected from the quadrants by the diagonal intersection detecting unit 5*f*, based on coordinates of the rectangle and the center point.

The distance straight-line selecting unit 5*h* selects a distance straight line having the shortest distance calculated by the distance calculating unit 5*g* among the quadrants.

The corrected image generating unit 5*i* performs a geometric correction on the document image to extend the contour to a correction reference line determined from the distortion position detected by the distortion position detecting unit 5*c*, and generates a corrected image having the distortion in the document image corrected.

Here, the corrected image generating unit 5*i* further includes the contour curve intersection detecting unit 5*j*, the correction reference point determining unit 5*k*, the correction reference line determining unit 5*m*, the longitude and latitude estimating unit 5*n*, the document image pixel coordinate acquiring unit 5*o*, and the corrected image pixel coordinate determining unit 5*p*. The corrected image generating unit 5*i* generates the corrected image having the distortion in the document image corrected, using the coordinates of each pixel in the corrected image determined by the corrected image pixel coordinate determining unit 5p.

Out of these units, the contour curve intersection detecting unit 5j detects two intersections of the contour straight line detected as the distortion position by the distortion position detecting unit 5c with contour curves adjacent to the contour straight line on the contour.

The correction reference point determining unit 5k determines a first correction reference point positioned on a first side of the rectangle on the same Y-coordinate as a second intersection of the two intersections detected by the contour curve intersection detecting unit 5j, and a second correction reference point positioned on a second side of the rectangle on the same X-coordinate as a third intersection of the two intersections detected by the contour curve intersection detecting unit 5j.

The correction reference line determining unit 5m determines the correction reference line that is formed with a third side connecting the first correction reference point and the second correction reference point determined by the correction reference point determining unit 5k, and the sides of the rectangle other than the corner portion of the rectangle separated by the third side.

The longitude and latitude estimating unit 5n estimates distorted longitude and latitude lines in a document portion surrounded by the contour, based on coordinates of the correction reference line determined by the correction reference line determining unit 5m, coordinates of the contour extracted by the contour extracting unit 5b, and coordinates of each pixel in the corrected image estimated from the coordinates of the correction reference line.

The document image pixel coordinate acquiring unit 5o acquires coordinates of each pixel in the document image corresponding to the coordinates of each pixel in the corrected image, based on coordinates of the distorted longitude and latitude lines estimated by the longitude and latitude estimating unit 5n, the coordinates of the contour extracted by the contour extracting unit 5b, the coordinates of the correction reference line determined by the correction reference line determining unit 5m, and the coordinates of each pixel in the corrected image estimated from the coordinates of the correction reference line.

The corrected image pixel coordinate determining unit 5p interpolates the coordinates of each pixel in the document image acquired by the document image pixel coordinate acquiring unit 5o and determines the coordinates of each pixel in the corrected image having the longitude line, the latitude line, and the contour, linearized and aligned with the correction reference line.

The approximate contour forming unit 5q forms an approximate contour by extracting at least three representative points from the contour extracted by the contour extracting unit 5b, and calculating points other than the representative points through a spline interpolation with the use of the representative points.

The contour verifying unit 5r determines whether a difference between the approximate contour formed by the approximate contour forming unit 5q and the contour extracted by the contour extracting unit 5b is greater than a predetermined threshold value, to verify that the contour extracting unit 5b accurately extracts the contour.

Referring back to FIG. 1, the CPU 6 controls the image processing apparatus 1. The CPU 6 is connected to the image memory unit 4, the image processing unit 5, the display panel 7, the external storage device 8, the external interface unit 9, and the likes. The CPU 6 controls the image memory unit 4, controls the image processing of image data containing document image data by the image processing unit 5, controls display by the display panel 7, controls data transmission and reception to and from the external storage device 8, controls data transmission and reception to and from external devices (not shown) via the external interface unit 9, and the likes.

As shown in FIG. 1, the display panel 7 displays data. The display panel 7 can display image data containing the document image data stored in the image memory unit 4. The display panel 7 is connected to the CPU 6, and is controlled by the CPU 6.

As shown in FIG. 1, the external storage device 8 is a portable storage unit, for example. The external storage device 8 can store image data containing the document image data stored in the image memory unit 4 of the image processing apparatus 1 via the CPU 6. The image memory unit 4 can store image data containing the document image data stored in the external storage device 8 via the CPU 6. The external storage device 8 is connected to the CPU 6, and is controlled by the CPU 6.

As shown in FIG. 1, the external interface unit 9 electrically connects the image processing apparatus 1 to an external device (not shown) provided outside the image processing apparatus 1. The external interface unit 9 can store image data containing the document image data stored in the image memory unit 4 of the image processing apparatus 1 into the electrically connected external device via the CPU 6. The image memory unit 4 can store image data containing the document image data stored in the external device via the CPU 6. The external interface unit is connected to the CPU 6, and is controlled by the CPU 6.

Processing of the Image Processing Apparatus 1

Subsequently, an example of processing of the image processing apparatus 1 according to the embodiment will be explained in detail below with reference to FIGS. 3 to 6.

Basic Processing

First, an example of basic processing of the image processing apparatus 1 will be explained in detail below with reference to FIG. 3.

Figure 3:
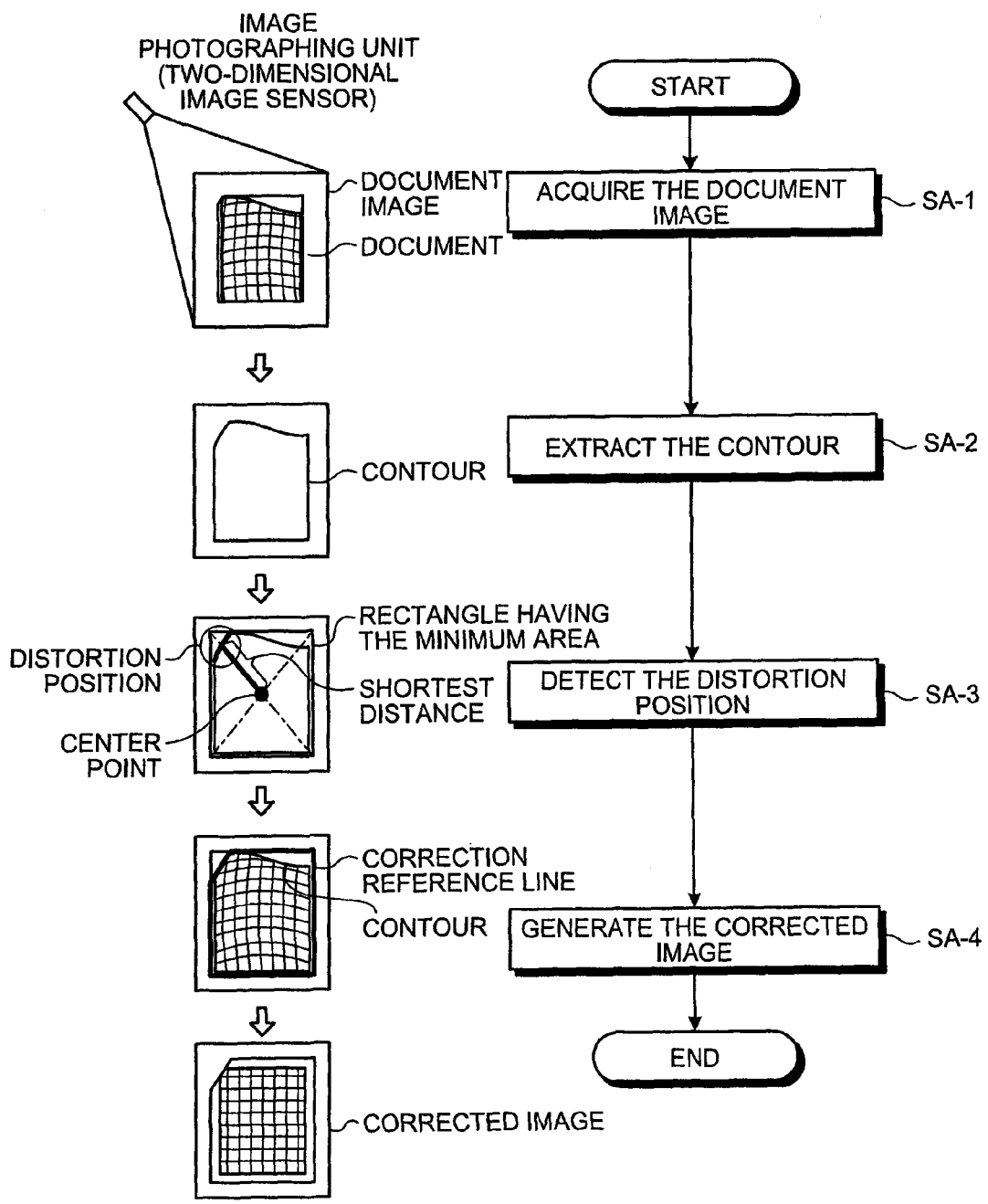
FIG. 3 is a flowchart showing one example of a basic processing according to an embodiment.

As shown in FIG. 3, the document image acquiring unit 5a acquires a document image including at least an image of a document photographed by the image photographing unit 2. (step SA-1).

The contour extracting unit 5b extracts a contour of the document from the document image acquired by the document image acquiring unit 5a, the extracting the contour being performed based on luminance (step SA-2).

Here, prior to step SA-3, the contour verifying unit 5r may verify that the contour extracting unit 5b accurately extracts the contour. This contour verifying processing is explained in detail below.

The distortion position detecting unit 5c detects a contour straight line located at a location where a distance between the contour extracted by the contour extracting unit 5b and a center point of a rectangle having the minimum area surrounding the contour is shortest, the contour straight line being detected as a distortion position in the document, the contour straight line being located on the contour (step SA-3). This processing of step SA-3 is explained in detail below.

The corrected image generating unit 5i performs a geometric correction on the document image to extend the contour to a correction reference line determined from the distortion position detected by the distortion position detecting unit 5c, and generates a corrected image having the distortion in the document image corrected (step SA-4). This process of step SA-4 is explained in detail below.

As described above, in the image processing apparatus 1 according to the present invention, the face of a document is uplifted near the portion bound with the other pages by a staple or the like, when images of the document bound by the staple or the likes are photographed by an image photographing unit such as a two-dimensional image sensor. As a result, distortions are caused near the respective stapled portions of the photographed images. However, the distortions in the photographed images formed by picking up images of uplifted portions of the document bound by a staple or the likes can be corrected. Thus, according to the present invention, corrected images can be formed by expanding distorted images on a plane so as to increase the easiness in reading the text information in the photographed images and the OCR recognition rate with respect to the photographed images.

Distortion Position Detecting Processing

Subsequently, an example of the distortion position detecting processing by the distortion position detecting unit 5c at step SA-3 in FIG. 3 will be explained in detail below with reference to FIG. 4.

Figure 4:
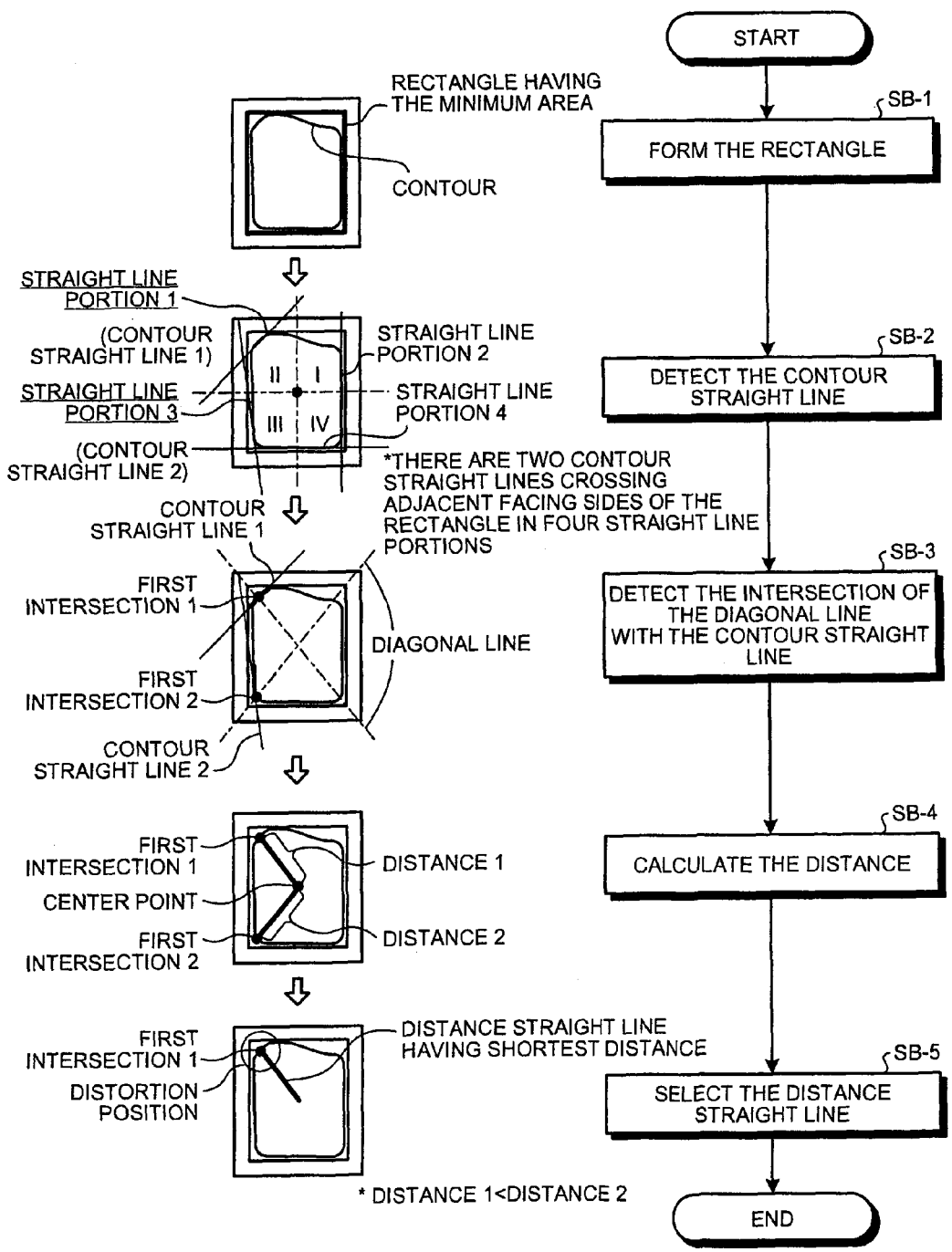
FIG. 4 is a flowchart showing one example of a distortion position detecting processing according to the embodiment.

As shown in FIG. 4, the rectangle forming unit 5d forms the rectangle having the minimum area surrounding the contour extracted by the contour extracting unit 5b at step SA-2 in FIG. 3 (step SB-1).

The contour straight line detecting unit 5e divides the formed rectangle into four quadrants (the first quadrant, the second quadrant, the third quadrant, and the forth quadrant), detects a straight line portion (corresponding to the straight line portion 1 to 4 in FIG. 4) on the contour from the respective quadrants, and detects the contour straight line (corresponding to the straight line portion 1 (the contour straight line 1) and the straight line the portion 3 (the contour straight line 2) in FIG. 4) crossing adjacent facing sides of the rectangle from the straight line portion (step SB-2).

The diagonal intersection detecting unit 5f detects a first intersection (corresponding to the first intersection 1 and 2 in FIG. 4) of a diagonal line of the rectangle with the contour straight line (corresponding to the contour straight line 1 and 2 in FIG. 4) detected from the quadrants by the contour straight line detecting unit 5e (step SB-3).

The distance calculating unit 5g calculates a distance (corresponding to the distance 1 and 2 in FIG. 4) between the center point of the rectangle and the first intersection detected from the quadrants by the diagonal intersection detecting unit 5f, based on coordinates of the rectangle and the center point (step SB-4).

The distance straight line selecting unit 5h selects a distance straight line (corresponding to the distance 1 in the second quadrant in FIG. 4) having the shortest distance calculated by the distance calculating unit 5g among the quadrants (step SB-5).

The distortion position detecting unit 5c detects the contour straight line crossing the distance straight line (corresponding to the distance straight line having shortest distance in the second quadrant in FIG. 4) selected by the distance straight line selecting unit 5h at the first intersection (corresponding to the first intersection 1 in FIG. 4), the contour straight line being detected as the distortion position of the document.

Also, in the later described contour verifying processing that is performed prior to the distortion position detecting processing for example, the distortion position detecting unit 5c may detect the contour straight line as the distortion position of the document located at a position where the distance between the contour and the center point of the rectangle having the minimum area surrounding the verified contour is shortest, when that the difference is smaller than the predetermined threshold value is determined and that the contour extracting unit 5b accurately extracts the contour is verified at the contour verifying processing. The distortion position may include a bound position (such as a stapled bound position) when the document is bound with a binding tool (such as a staple).

Corrected Image Generating Processing

Subsequently, an example of the corrected image generating processing by the corrected image generating unit 5i at step SA-4 in FIG. 3 will be explained in detail below with reference to FIG. 5.

Figure 5:
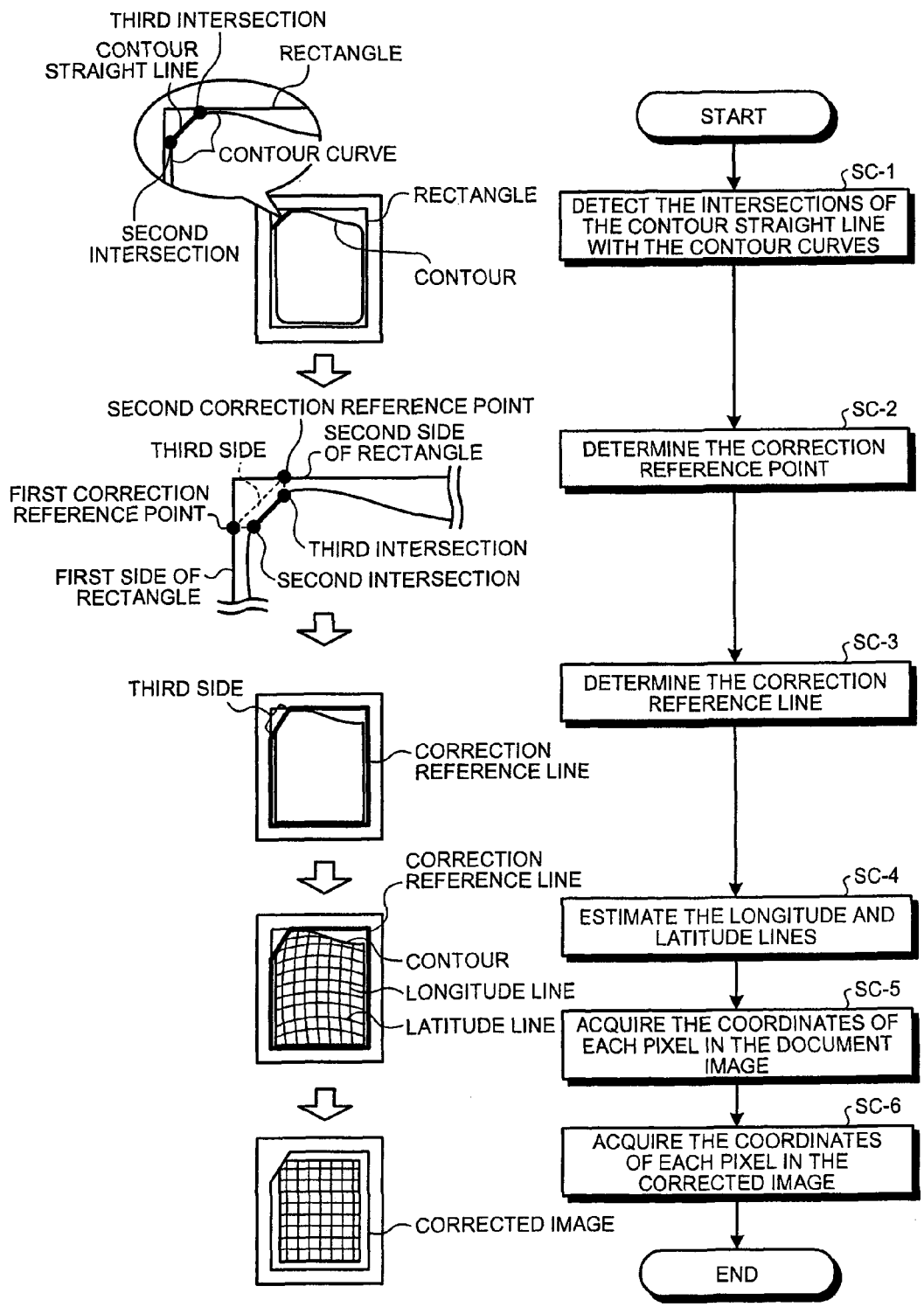
FIG. 5 is a flowchart showing one example of a corrected image generating processing according to the embodiment.

As shown in FIG. 5, the contour curve intersection detecting unit 5j detects two intersections of the contour straight line detected as the distortion position by the distortion position detecting unit 5c at step SA-3 in FIG. 3 with contour curves adjacent to the contour straight line on the contour (step SC-1).

The correction reference point determining unit 5k determines a first correction reference point positioned on a first side of the rectangle on the same Y-coordinate as a second intersection of the two intersections detected by the contour curve intersection detecting unit 5j, and a second correction reference point positioned on a second side of the rectangle on the same X-coordinate as a third intersection of the two intersections detected by the contour curve intersection detecting unit 5j (step SC-2).

The correction reference line determining unit 5m determines the correction reference line that is formed with a third side connecting the first correction reference point and the second correction reference point determined by the correction reference point determining unit 5k, and the sides of the rectangle other than the corner portion of the rectangle separated by the third side (step SC-3).

The longitude and latitude estimating unit 5n estimates distorted longitude and latitude lines in a document portion surrounded by the contour, based on coordinates of the correction reference line determined by the correction reference line determining unit 5m, coordinates of the contour extracted by the contour extracting unit 5b, and coordinates of each pixel in the corrected image estimated from the coordinates of the correction reference line (step SC-4).

The document image pixel coordinate acquiring unit 5o acquires coordinates of each pixel in the document image corresponding to the coordinates of each pixel in the corrected image, based on coordinates of the distorted longitude and latitude lines estimated by the longitude and latitude estimating unit 5n, the coordinates of the contour extracted by the contour extracting unit 5b, the coordinates of the correction reference line determined by the correction reference line determining unit 5m, and the coordinates of each pixel in the corrected image estimated from the coordinates of the correction reference line (step SC-5).

The corrected image pixel coordinate determining unit 5p interpolates the coordinates of each pixel in the document image acquired by the document image pixel coordinate acquiring unit 5o, and determines the coordinates of each pixel in the corrected image having the longitude line, the latitude line, and the contour, linearized and aligned with the correction reference line (step SC-6).

The corrected image generating unit 5i generates the corrected image having the distortion in the document image corrected, using the coordinates of each pixel in the corrected image determined by the corrected image pixel coordinate determining unit 5p.

Contour Verifying Processing

Subsequently, an example of the contour verifying processing by the approximate contour forming unit 5q and the contour verifying unit 5r that is performed prior to the distortion position detecting processing (prior to step SA-3 in FIG. 3, and steps SB-1 to SB-5 in FIG. 4) for example will be explained in detail below with reference to FIG. 6.

Figure 6:
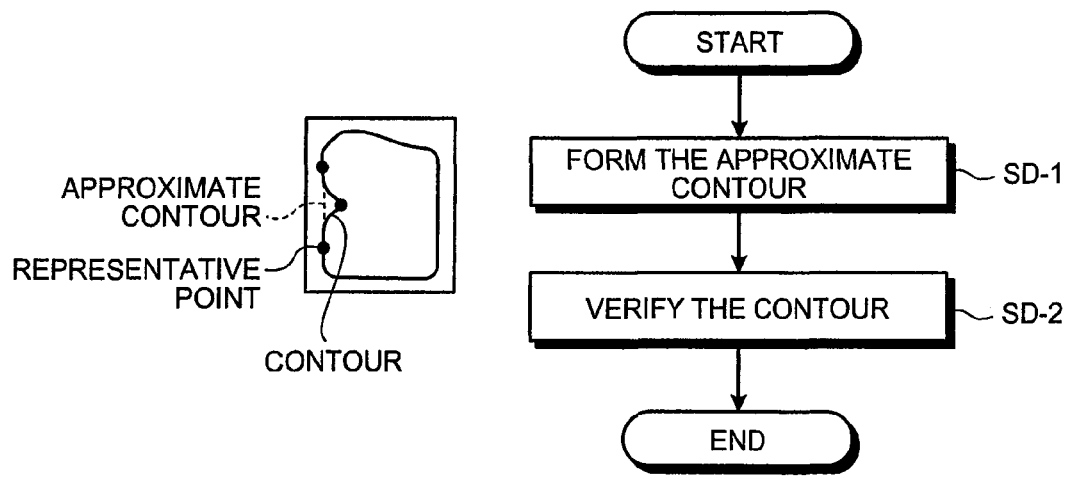
FIG. 6 is a flowchart showing one example of a contour verifying processing according to the embodiment.

As shown in FIG. 6, the approximate contour forming unit 5q forms an approximate contour (corresponding to dashed line in FIG. 6) by extracting at least three representative points from the contour extracted by the contour extracting unit 5b, and calculating points other than the representative points through a spline interpolation with the use of the representative points (step SD-1).

The contour verifying unit 5r determines whether a difference between the approximate contour formed by the approximate contour forming unit 5q and the extracted contour (corresponding to the solid line in FIG. 6) is greater than a predetermined threshold value, to verify that the contour is accurately extracted (step SD-2).

Embodiments

Subsequently, an embodiment of the image processing of the image processing apparatus will be explained in detail below with reference to FIGS. 7 to 16.

Figure 7:
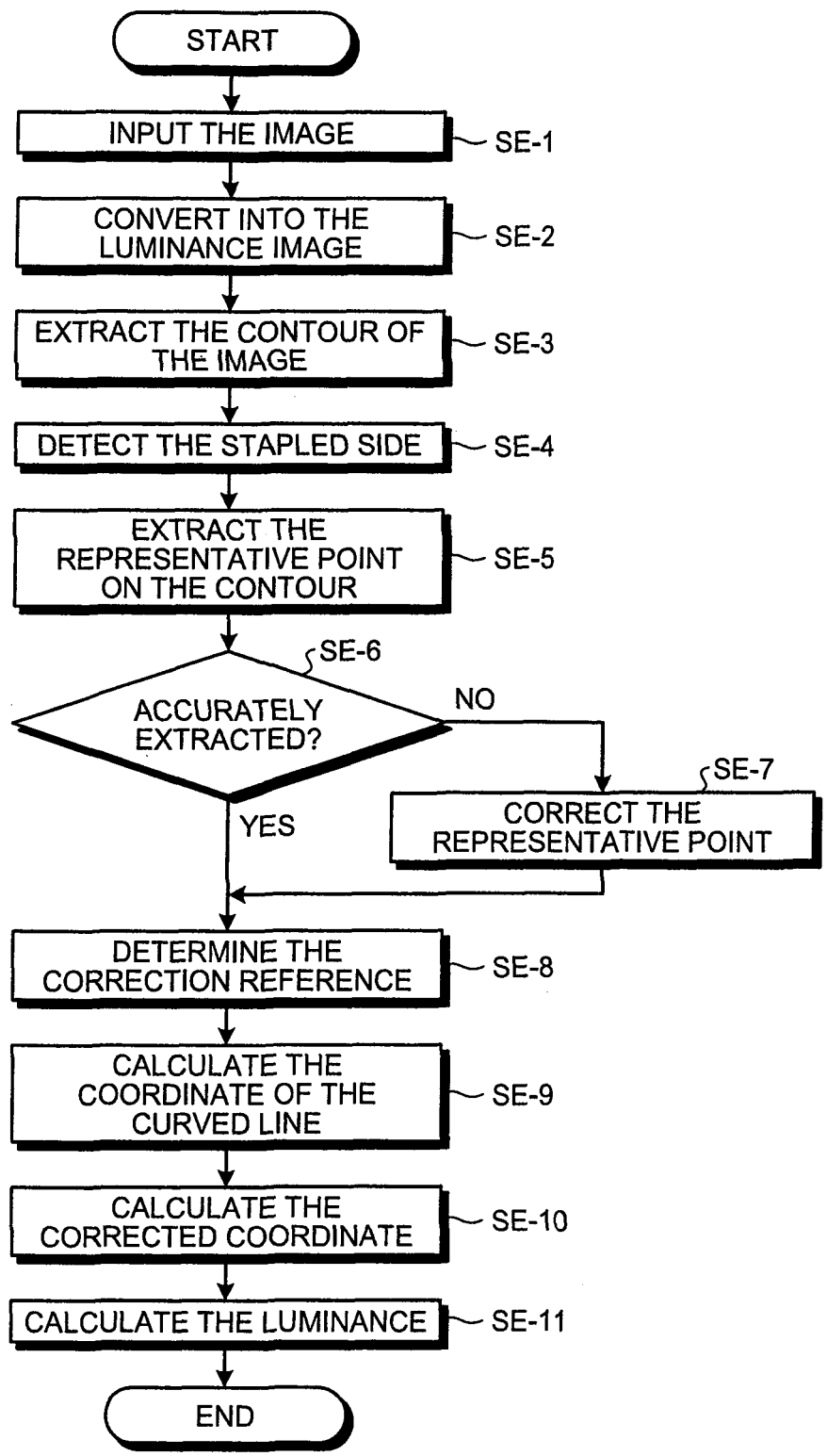
FIG. 7 is an embodiment of an image processing of the image processing apparatus 1.

Referring now to FIGS. 8 through 16, an embodiment of an image processing operation to be performed on a document image including a bound portion (such as a stapled side) with a binding piece (such as a staple) is described along the operation flow of steps SE-1 through SE-11 of FIG. 7.

As shown in FIG. 7, the document image acquiring unit 5a acquires an image of a document including at least a document photographed by the image photographing unit 2 (a document that has its left corner bound with a stapler, and has its pages turned over), so as to perform an image input (step SE-1).

The contour extracting unit 5b converts the document image into a luminance image, based on the luminance of the document image acquired by the document image acquiring unit 5a (step SE-2).

Figure 8:
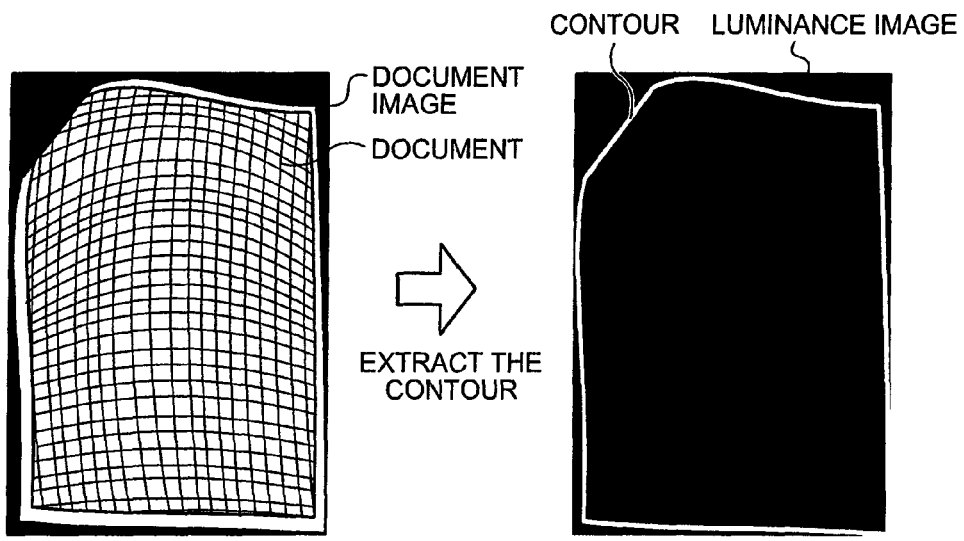
FIG. 8 is a view showing one example of a contour extraction result according to the embodiment.

The contour extracting unit 5b extracts the contour of the document (corresponding to the white line in FIG. 8) from the converted luminance image, as shown in FIG. 8 (step SE-3).

Figure 9:
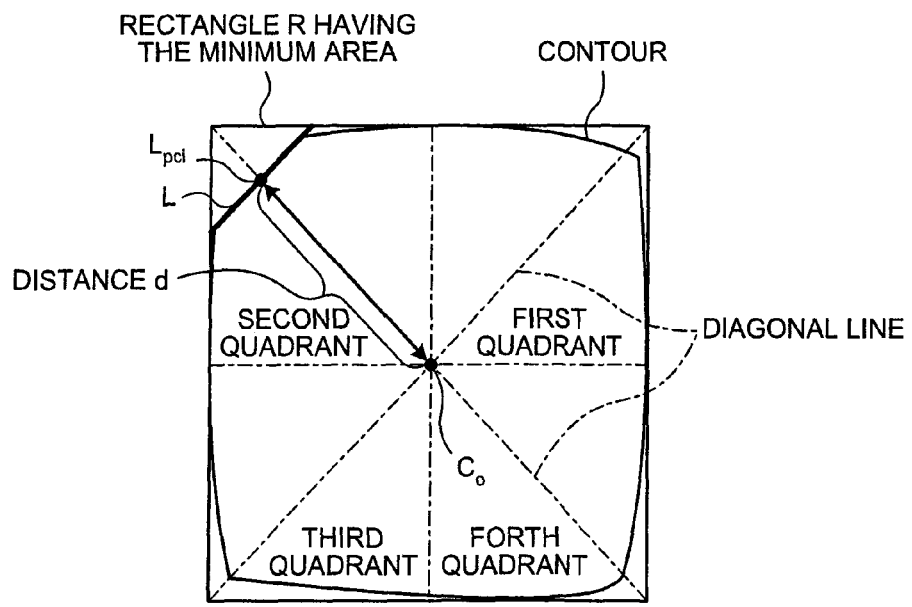
FIG. 9 is a view showing one example of detail of distortion position detecting according to the embodiment.

The rectangle forming unit 5d of the distortion position detecting unit 5c forms a rectangle R having the minimum area to surround the contour extracted by the contour extracting unit 5b, as shown in FIG. 9. The minimum area of the rectangle R is expressed by the following formula (1):

$$R \in P(w, h) \atop S \to min$$ (Formula 1)

As shown in FIG. 9, the contour straight-line detecting unit 5e of the distortion position detecting unit 5c divides the rectangle R formed by the rectangle forming unit 5d into four quadrants (first through fourth quadrants in FIG. 9). The contour straight-line detecting unit 5e detects straight-line portions from the contours of the respective quadrants, and obtains a set of straight-line portions crossing the adjacent lines of the rectangle R among the straight-line portions. In this manner, the contour straight-line detecting unit 5e detects a contour straight line L. As shown in FIG. 9, the diagonal intersection detecting unit 5f of the distortion position detecting unit 5c detects a first intersection $L_{pci}$ of a diagonal line of the rectangle R with the contour straight line L detected from the quadrants by the contour straight-line detecting unit 5e. As shown in FIG. 9, the distance calculating unit 5g of the distortion position detecting unit 5c calculates the distance d between the center point $C_o$ of the rectangle R and the first intersection $L_{pci}$ detected from the quadrants by the diagonal intersection detecting unit 5f, according to the following formula (2) based on the coordinates of the first intersection $L_{pci}$ and the coordinates of the center point $C_o$:

$$d_i = \sqrt{(C_{ox} - L_{pcix})^2 + (C_{oy} - L_{pciy})^2}$$ (Formula 2)

As shown in FIG. 9, the distance straight-line selecting unit 5h of the distortion position detecting unit 5c selects the distance straight line (corresponding to the diagonal line of the distance d in the second quadrant in FIG. 9) having the minimum distance d calculated by the distance calculating unit 5g among all the quadrants. The distortion position detecting unit 5c then detects the contour straight line L crossing the distance straight line selected by the distance straight-line selecting unit 5h at the first intersection $L_{pci}$, and sets the contour straight line L as the distorted portion (the stapled side, for example) of the document (step SE-4).

Figure 10:
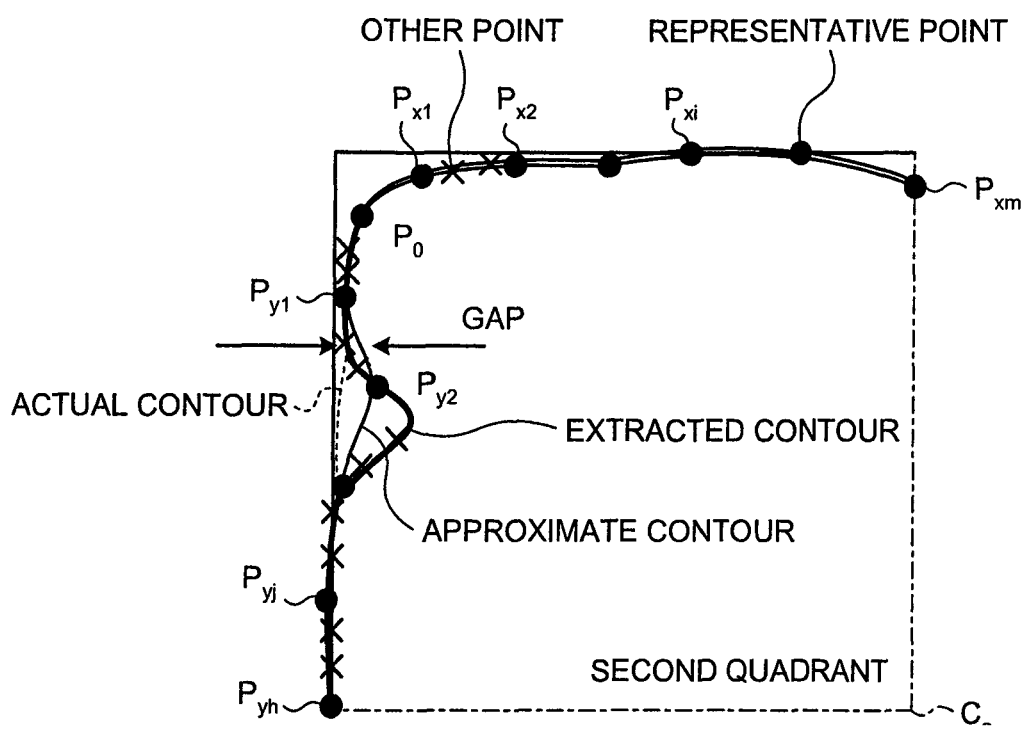
FIG. 10 is a view showing one example of detail of contour verifying according to the embodiment.

Since the coordinates on the contour extracted by the contour extracting unit 5b are expressed by integers, the approximate contour forming unit 5q extracts some representative points on the contour, as shown in FIG. 10, which is a diagram of the second quadrant as an example. To perform a correction with higher precision, the approximate contour forming unit 5q performs a cubic spline interpolation, to determine the coordinates of points other than the representative points (step SE-5).

More specifically, at step SE-5, the approximate contour forming unit 5q extracts at least three representative points (upper-side representative points $\{P_0, P_{x1}, \ldots, P_{xm}\}$ and left-side representative points $\{P_0, P_{y1}, \ldots, P_{yh}\}$ indicated by solid large dots) from the contour (corresponding to the thick solid line in FIG. 10) extracted by the contour extracting unit 5b, as shown in FIG. 10. It is desirable that the numbers {m, h} of representative points are three or more (five or six, for example). The approximate contour forming unit 5q then performs a spline interpolation (a cubic spline interpolation, for example), using the extracted representative points. The approximate contour forming unit 5q calculates the coordinates Sx and Sy of the other points (the points indicated by cross marks shown among the representative points), to form an approximate contour (corresponding to the thin solid line in FIG. 10).

As shown in FIG. 10, the contour verifying unit 5r determines whether the difference between the coordinates ($S_{x(i)}$ and $S_{y(j)}$, for example) of the approximate contour formed by the approximate contour forming unit 5q and the contour ($P_{x(i)}$ and $P_{y(j)}$, for example) extracted by the contour extracting unit 5b is greater than a predetermined threshold value (σ, for example). When $|S_{x(i)} - P_{x(i)}|$ is greater than σ or $|S_{y(j)} - P_{y(j)}|$ is greater than σ, the contour verifying unit 5 determines that the extracted contour is not accurate, for example. In this manner, the contour verifying unit 5r verifies that the contour is accurately extracted by the contour extracting unit 5b like actual contour (corresponding to the dashed line in FIG. 10) (step SE-6).

Since an accurate correction cannot be performed when the contour of a document is not accurately extracted at the time of a distorted image correction, the contour verifying unit 5r verifies that the contour is accurately extracted by the contour extracting unit 5b in the above manner. More specifically, even if the distortion of the document is reflected in the contour, the contour verifying unit 5r determines that large distortions in the contour are not realistic. The contour verifying unit 5r compares the coordinates ($P_{x(i)}$ and $P_{y(j)}$, for example) of a representative point on the contour with the coordinates ($S_{x(i)}$ and $S_{y(j)}$, for example) of the corresponding point on the approximate contour formed by the approximate contour forming unit 5q. If there is a certain difference (when the difference is greater than the predetermined threshold value σ, or $|S_{x(i)}-P_{x(i)}|$ is greater than σ or $|S_{y(j)}-P_{y(j)}|$ is greater than σ, for example), the contour verifying unit 5r determines that the contour extracting unit 5b has not accurately extracted the contour.

When the contour verifying unit 5r in the procedure at step SE-6 determines that the difference is equal to or smaller than the predetermined threshold value ($|S_{x(i)}-P_{x(i)}|$ is equal to or smaller than σ, or $|S_{y(j)}-P_{y(j)}|$ is equal to or smaller than σ, for example), and verifies that the contour extracting unit 5b has accurately extracted the contour (step SE-6: Yes), the operation moves on to step SE-8.

When the contour verifying unit 5r in the procedure at step SE-6 determines that the difference is greater than the predetermined threshold value ($|S_{x(i)}-P_{x(i)}|$ is greater than σ, or $|S_{y(j)}-P_{y(j)}|$ is greater than σ, for example), and verifies that the contour extracting unit 5b has not accurately extracted the contour (step SE-6: No), a user manually corrects the representative points (corresponding to $\{P_0, P_{x1}, \ldots, P_{xm}\}$ and $\{P_0, P_{y1}, \ldots, P_{yn}\}$ in FIG. 10) positioned on the contour with an input unit (step SE-7), and, according to the coordinates of the corrected representative points, the operation moves on to step SE-8.

Figure 11:
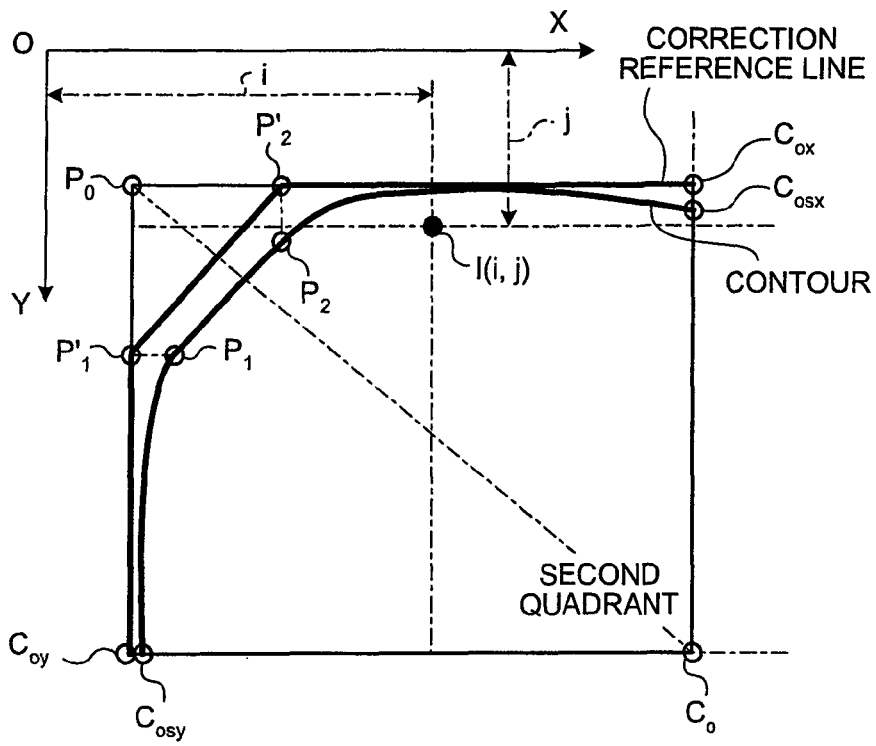
FIG. 11 is a view showing one example of detail of correction reference line determining according to the embodiment.

As shown in FIG. 11, which is a diagram of the second quadrant as an example, the contour curve intersection detecting unit 5j of the corrected image generating unit 5i detects two intersections ($P_1$ and $P_2$ in FIG. 11) of the contour straight line (corresponding to the straight line connecting $P_1$ and $P_2$ in FIG. 11) detected as the distorted position (including the bound position) by the distortion position detecting unit 5c with contour curves adjacent to the contour straight line on the contour (corresponding to the curve connecting $P_1$ and $C_{osy}$, and the curve connecting $P_2$ and $C_{osx}$ in FIG. 11). Based on a second intersection (corresponding to $P_1$ in FIG. 11) and a third intersection (corresponding to $P_2$ in FIG. 11) of the two intersections detected by the contour curve intersection detecting unit 5j, the correction reference point determining unit 5k of the corrected image generating unit 5i determines a first correction reference point (corresponding to $P'_1$ in FIG. 11) positioned on the first side (corresponding to the side connecting $P_0$ and $C_{oy}$ in FIG. 11) of the rectangle on the Y-coordinate like the second intersection, and a second correction reference point (corresponding to $P'_2$ in FIG. 11) positioned on the second side (corresponding to the side connecting $P_0$ and $C_{ox}$ in FIG. 11) of the rectangle on the X-coordinate like the third intersection, as shown in FIG. 11. The X-coordinates of $P'_2$ and $P_2$ are the same, and the Y-coordinates of $P'_1$ and $P_1$ are also the same. The correction reference line determining unit 5m of the corrected image generating unit 5i then determines a correction reference line (corresponding to the side of $C_{oy}P'_1P'_2C_{ox}$ in FIG. 11) formed with a third side (corresponding to the side connecting $P'_1$ and $P'_2$ in FIG. 11) connecting the first correction reference point and the second correction reference point determined by the correction reference point determining unit 5k, and the respective sides (corresponding to the side connecting $P'_1$ and $C_{oy}$, the side connecting $P'_2$ and $C_{ox}$, and the likes in FIG. 11) of the rectangle other than the corner portion separated by the third side, as shown in FIG. 11 (step SE-8).

According to the present invention, the correction reference line determined by the correction reference point determining unit 5k is used to correct an image expanded on a plane by the later described corrected image generating unit 5i aligning a document image having a distorted portion with the correction reference line. More specifically, the correction reference line determined by the correction reference point determining unit 5k is used to correct an distorted image by aligning the $P_2C_{osx}$ side with the $P'_2C_{ox}$ side, the $P_1P_2$ side with the $P'_1P'_2$ side, and the $P_1C_{osy}$ side with the $P'C_{oy}$ side, as shown in FIG. 11. When the correction reference line in the X-direction is $P'_2P'_1C_{oy}$, the corresponding contour is $P_2P_1C_{osy}$ shown in FIG. 11. Likewise, when the correction reference line in the Y-direction is $P'_1P'_2C_{ox}$, the corresponding contour is $P_1P_2C_{osx}$ shown in FIG. 11. Here, the X-coordinate of $P'_2P'_1C_{oy}$ of the correction reference line is represented by $P_x$, the X-coordinate of $P_2P_1C_{osy}$ of the contour is represented by $S_x$, the Y-coordinate of $P'_1P'_2C_{ox}$ of the correction reference line is represented by $P_y$, and the Y-coordinate of $P_1P_2C_{osx}$ of the contour is represented by $S_y$.

Figure 12:
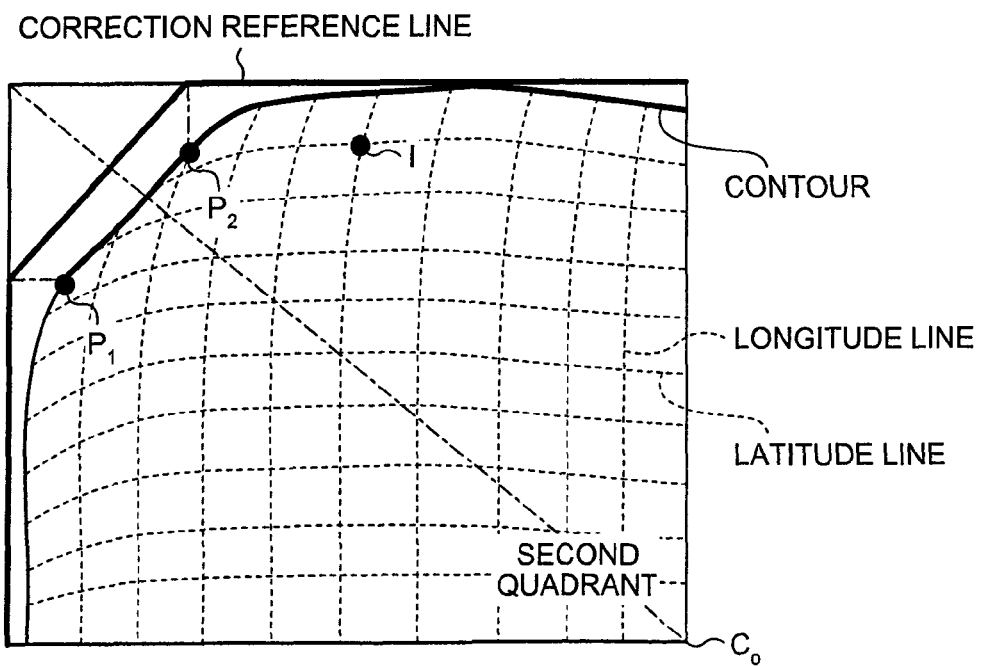
FIG. 12 is a view showing one example of detail of longitude and latitude estimating according to the embodiment.

The longitude and latitude estimating unit 5n of the corrected image generating unit 5i is to obtain an image expanded on a plane by the correcting mechanism of the present invention estimating the distortions in the longitude and latitude lines from the contour, and turning the estimated distortions in the longitude and latitude lines into straight lines. Therefore, as shown in FIG. 12, based on the coordinates ($P_x$ and $P_y$) of the correction reference line determined by the correction reference line determining unit 5m, the coordinates ($S_x$ and $S_y$) of the contour extracted by the contour extracting unit 5b, and the coordinates ($x_{dst}$ and $y_{dst}$) of each pixel in the corrected image estimated from the coordinates of the correction reference line, the longitude and latitude estimating unit 5n estimates the distorted longitude and latitude lines in the document portion surrounded by the contour. In this manner, the longitude and latitude estimating unit 5n calculates the coordinates of the curved lines (or the coordinates ($x_i$, $y_j$) of each pixel forming the distorted longitude and latitude lines), and estimates the degree of distortion in the document image (step SE-9).

More specifically, the longitude and latitude estimating unit 5n calculates the coordinates ($x_i$, $y_j$) of distorted longitude and latitude lines, using the formula (3) and the formula (4) shown below. Here, the coordinates of a corrected image estimated with respect to a pixel I (i, j) are ($x_{dst}$, $y_{dst}$) In FIG. 13, $C_o$ represents the center point of the camera of the image photographing unit 2, the contour straight line $P_1P_2$ represents the stapled side that is the bound position, and ($S_x$, $S_y$) represents the coordinates of the contour curves adjacent to the contour straight line $P_1P_2$. The correction reference side is represented by ($P_x$, $P_y$). In the following, the calculation of $y_j$ and the calculation of $x_i$ are explained separately from each other.

Calculation of $y_j$

Figure 13:
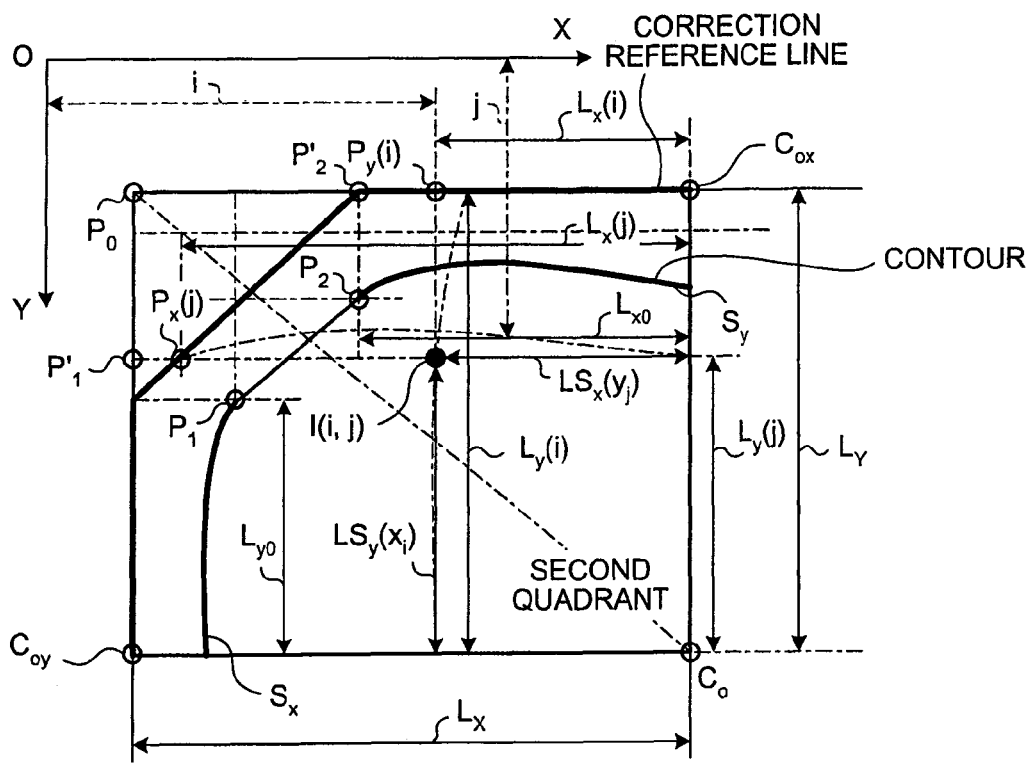
FIG. 13 is a view showing one example of detail of geometric correction according to the embodiment.

When calculating $y_j$, the longitude and latitude estimating unit 5n extends the length $L_{y0}$ of the distorted contour curve $S_x$ to the correction reference line on the column where the pixel I is located, and the total length is set as $L_{y(i)}$, as shown in FIG. 13. In this embodiment, L represents a line length. For example, in the formula (3), the length "$L_{y0}$" is equal to "$C_{oy}-P_{1y}$", the length "$L_{y(i)}$" is equal to "$C_{oy}-P_y(x_{dst})$", and the length "$L_y(x_{dst})$" is equal to "$C_{oy}-Y_{dst}$". The longitude and latitude estimating unit 5n then calculates the original Y-coordinate ($y_j$) of the pixel I according to the following formula (3) having $P_1$ as the origin of the distorted contour curve $S_x$. This calculation is performed to estimate the degree of distortion with respect to the column on which the pixel I is located, based on the distorted contour curve $S_x$.

$$y_j = L_{y0} - \frac{L_{y0}}{L_y(i)} * L_y(x_{dst}) \quad \text{(Formula 3)}$$

Calculation of $x_i$

When calculating $x_i$, the longitude and latitude estimating unit 5n extends the length $L_{x0}$ of the distorted contour curve $S_y$ to the correction reference line on the row where the pixel I is located, and the total length is set as $L_{x(j)}$, as shown in FIG. 13.

For example, in the formula (4), the length "$L_{x0}$" is equal to "$C_{o \cdot x} - P_{2 \cdot x}$", the length "$L_{x(j)}$" is equal to "$C_{o \cdot x} - P_x(y_{dst})$", and the length "$L_x(y_{dst})$" is equal to "$C_{o \cdot x} - x_{dst}$". The longitude and latitude estimating unit 5n then calculates the original X-coordinate ($x_i$) of the pixel I according to the following formula (4) having $P_2$ as the origin of the distorted contour curve $S_y$. This calculation is performed to estimate the degree of distortion with respect to the row on which the pixel I is located, based on the distorted contour curve $S_y$.

$$x_i = L_{x0} - \frac{L_{x0}}{L_x(j)} * L_x(y_{dst}) \quad \text{(Formula 4)}$$

The document image pixel coordinate acquiring unit 5o of the corrected image generating unit 5i acquires the coordinates ($x_{src}$, $y_{src}$) of each pixel in the document image corresponding to the coordinates of each pixel in the corrected image, based on the coordinates ($x_i$, $y_j$) of the distorted longitude and latitude lines estimated by the longitude and latitude estimating unit 5n, the coordinates ($S_x$ and $S_y$) of the contour extracted by the contour extracting unit 5b, the coordinates ($P_x$ and $P_y$) of the correction reference line determined by the correction reference line determining unit 5m, and the coordinates ($x_{dst}$ and $y_{dst}$) of each pixel in the corrected image estimated from the coordinates of the correction reference line. The corrected image pixel coordinate determining unit 5p of the corrected image generating unit 5i interpolates the coordinates ($x_{src}$, $y_{src}$) of each pixel in the document image acquired by the document image pixel coordinate acquiring unit 5o, so as to determine the coordinate ($I_n$) of each pixel of the corrected image having the longitude line, the latitude line, and the contour aligned with the correction reference line (step SE-10).

More specifically, the document image pixel coordinate acquiring unit 5o acquires the coordinates ($x_{src}$, $y_{src}$) of each pixel in the document image, using the formula (5) and the formula (6) shown below. In the following, the calculation of $x_{src}$ and the calculation of $y_{src}$ are explained separately from each other.

Calculation of $x_{src}$

When calculating $x_{src}$, the document image pixel coordinate acquiring unit 5o calculates each coordinate according to the following formula (5). For example, in the formula (5), the length "$LS_x(y_j)$" is equal to "$C_{o \cdot x} - S_x(y_j)$", the length "$L_x$" is equal to "$C_{o \cdot x} - P_{0 \cdot x}$", and the length "$L_x(x_{dst})$" is equal to "$C_{o \cdot x} - x_{dst}$".

$$x_{src} = C_{o \cdot x} - \frac{LS_x(y_j)}{L_X} * L_x(x_{dst}) \quad \text{(Formula 5)}$$

Calculation of $y_{src}$

When calculating $y_{src}$, the document image pixel coordinate acquiring unit 5o calculates each coordinate according to the following formula (6). For example, in the formula (6), the length "$LS_y(x_i)$" is equal to "$C_{o \cdot y} - S_y(x_i)$", the length "$L_y$" is equal to "$C_{o \cdot y} - P_{0 \cdot y}$", and the length "$L_y(y_{dst})$" is equal to "$C_{o \cdot y} - y_{dst}$".

$$y_{src} = C_{o \cdot y} - \frac{LS_y(x_i)}{L_Y} * L_y(y_{dst}) \quad \text{(Formula 6)}$$

Figure 14:
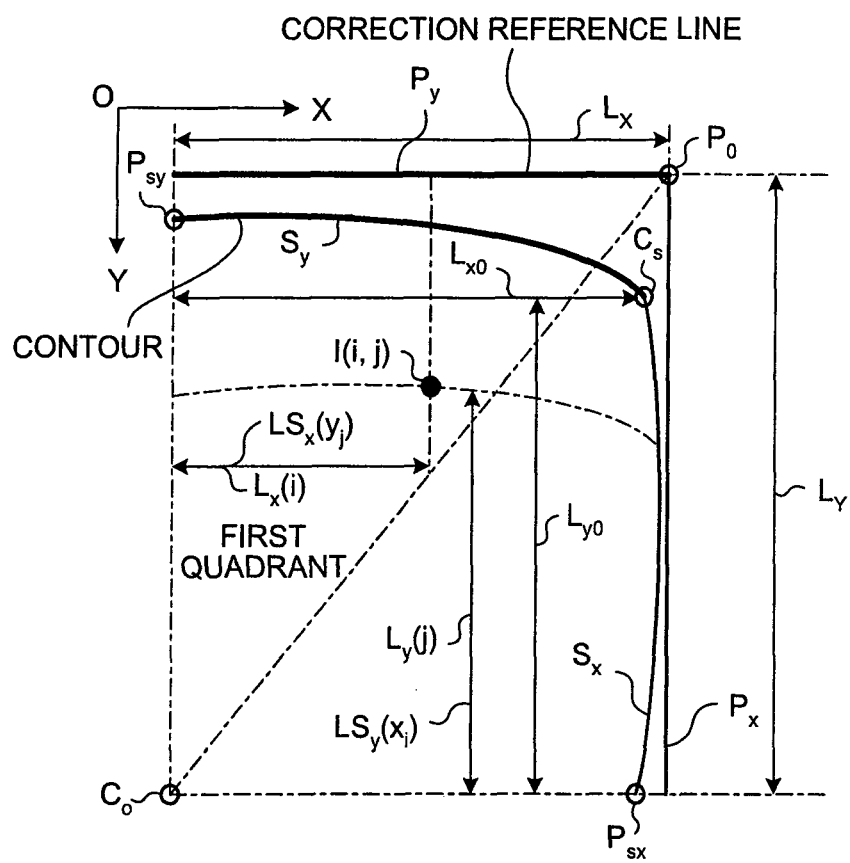
FIG. 14 is a view showing another example of detail of geometric correction according to the embodiment.

Referring now to FIG. 14, the correcting operation to be performed on the quadrants (such as the first quadrant in this embodiment) other than the quadrants including the stapled side at the bound position is described.

As shown in FIG. 14, the image processing unit 5 determines the intersection $C_s$ of the distorted contour curve $S_x$ with the distorted contour curve $S_y$, based on the distorted contour curves $S_x$ and $S_y$. The image processing unit 5 aligns the distorted contour curve $S_x$ with the side $P_x$ of the rectangle of the minimum area, and also aligns the distorted contour curve $S_y$ with the side $P_y$ of the rectangle of the minimum area. The image processing unit 5 then calculates the coordinates of each pixel I so that the curves (such as the contour curves $S_x$ and $S_y$) turn into straight lines. In doing so, the image processing unit 5 extends the intersection $C_S$ to the corrected intersection $P_0$.

More specifically, the longitude and latitude estimating unit 5n calculates the coordinates ($x_i$, $y_j$) of distorted longitude and latitude lines, using the formula (7) and the formula (8) shown below. In FIG. 14, $C_o$ represents the center point of the camera of the image photographing unit 2, and ($S_x$, $S_y$) represents the coordinates of the contour curves. The correction reference side is represented by ($P_x$, $P_y$) In the following, the calculation of $y_j$ and the calculation of $x_i$ are explained separately from each other.

Calculation of $y_j$

When calculating $y_j$, the longitude and latitude estimating unit 5n extends the length $L_{y0}$ of the distorted contour curve $S_x$ to the correction reference line, and the total length is set as $L_y$, as shown in FIG. 14. For example, in the formula (7), the length "$L_Y$" is equal to "$C_{o \cdot y} - P_{0 \cdot y}$", the length "$L_{y0}$" is equal to "$C_{o \cdot y} - C_{s \cdot y}$", and the length "$L_y(Y_{dst})$" is equal to "$C_{o \cdot y} - y_{dst}$". The longitude and latitude estimating unit 5n then calculates the original Y-coordinate ($y_j$) of the pixel I according to the following formula (7) having $C_s$ as the origin of the distorted contour curve $S_x$.

$$y_j = L_Y - \frac{L_{y0}}{L_Y} * L_y(y_{dst}) \quad \text{(Formula 7)}$$

Calculation of $x_i$

When calculating $x_i$, the longitude and latitude estimating unit 5n extends the length $L_{x0}$ of the distorted contour curve $S_y$ to the correction reference line, and the total length is set as $L_X$, as shown in FIG. 14. For example, in the formula (8), the length "$L_X$" is equal to "$P_{0 \cdot x} - C_{o \cdot x}$", the length "$L_{x0}$" is equal to "$C_{s \cdot x} - C_{o \cdot s}$", and the length "$L_x(x_{dst})$" is equal to "$x_{dst} - C_{o \cdot x}$". The longitude and latitude estimating unit 5n then calculates the original X-coordinate ($x_i$) of the pixel I according to the following formula (8) having $P_{sy}$ as the origin of the distorted contour curve $S_y$.

$$x_i = \frac{L_{x0}}{L_X} * L_x(x_{dst}) \quad \text{(Formula 8)}$$

The document image pixel coordinate acquiring unit 5o then acquires the coordinates ($x_{src}$, $y_{src}$) of each pixel in the document image, using the formula (9) and the formula (10) shown below. In the following, the calculation of $x_{src}$ and the calculation of $y_{src}$ are explained separately from each other.

Calculation of $x_{src}$

When calculating $x_{src}$, the document image pixel coordinate acquiring unit 5o calculates each coordinate according to the following formula (9). For example, in the formula (9), the length "$LS_x(y_j)$" is equal to "$S_x(y_j)-C_{o \cdot x}$", the length "$L_x$" is equal to "$P_{0 \cdot x}-C_{o \cdot x}$", and the length "$L_x(x_{dst})$" is equal to "$x_{dst}-C_{o \cdot x}$".

$$x_{src} = C_{o \cdot x} + \frac{LS_x(y_j)}{L_X} * L_x(x_{dst}) \qquad \text{(Formula 9)}$$

Calculation of $y_{src}$

When calculating $y_{src}$, the document image pixel coordinate acquiring unit 5o calculates each coordinate according to the following formula (10). For example, in the formula (10), the length "$LS_y(x_i)$" is equal to "$C_{o \cdot y}-S_y(x_i)$", the length "$L_Y$" is equal to "$C_{o \cdot y}-P_{0 \cdot y}$", and the length "$L_y(y_{dst})$" is equal to "$C_{o \cdot y}-y_{dst}$".

$$y_{src} = C_{o \cdot x} + \frac{LS_y(x_i)}{L_Y} * L_y(y_{dst}) \qquad \text{(Formula 10)}$$

After the operation by the document image pixel coordinate acquiring unit 5o, the corrected image pixel coordinate determining unit 5p of the corrected image generating unit 5i performs an interpolation with the use of the formula (11) shown below, since the coordinates ($x_{src}$, $y_{src}$) of each pixel in the document image acquired by the document image pixel coordinate acquiring unit 5o (or the coordinates of the original image) are represented by decimal numbers. Through the interpolation, the corrected image pixel coordinate determining unit 5p determines the coordinate ($I_n$) of each pixel of the corrected image having the longitude line, the latitude line, and the contour aligned with the correction reference line.

$$I_n(i,j)=(I_o(i,j)*(1-dx)+I_o(i+1,j)*dx)*(1-dy)+(I_o(i,j+1)*(1-dx)+I_o(i+1,j+1)*dx)*dy \qquad \text{(Formula 11)}$$

Figure 15:
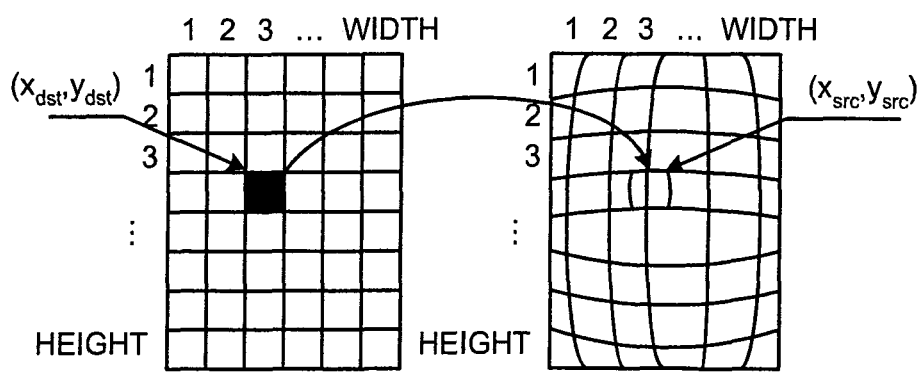
FIG. 15 is a view showing coordinates of each pixel according to the embodiment.

More specifically, the corrected image pixel coordinate determining unit 5p determines the coordinates ($x_{src}$, $y_{src}$) of the pixels in the document image (the original image) shown in the right-side drawing in FIG. 15. The coordinates ($x_{src}$, $y_{src}$) correspond to the coordinates ($x_{dst}$, $y_{dst}$) of the respective pixels in the estimated corrected image (the image obtained through a correction) shown in the left-side drawing in FIG. 15. In FIG. 15, $x_{dst}$ and $y_{dst}$ represent the coordinates of the respective pixels in the corrected image (or the coordinates of the respective pixels in the corrected image generated for the last time). Normally, the corrected image and the original image have the same size. Accordingly, $x_{dst}$ and $y_{dst}$ are integers such as "1", "2", and "3" in WIDTH, and "1", "2", and "3" in HEIGHT. In FIG. 15, $x_{src}$ and $y_{src}$ represents the coordinates of the pixels corresponding to $x_{dst}$ and $y_{dst}$ in the original image (or the coordinates observed before the distorted image correction).

Figure 16:
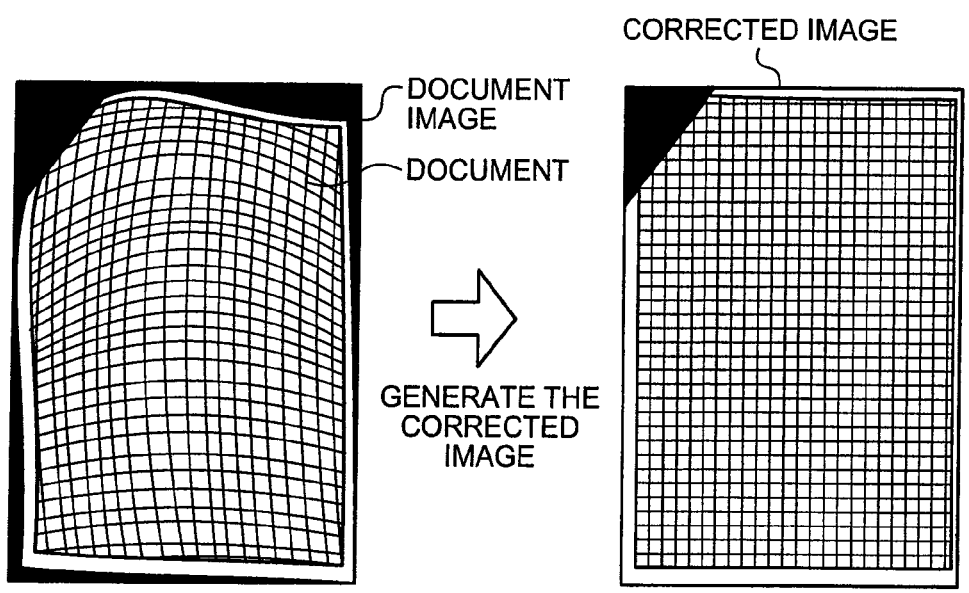
FIG. 16 is a view showing one example of the result of corrected image generating according to the embodiment.

The corrected image generating unit 5i then calculates the luminance of each pixel in the corrected image (step SE-11). Using the coordinate ($I_n$) of each pixel in the corrected image determined by the corrected image pixel coordinate determining unit 5p, the corrected image generating unit 5i generates a corrected image having the distortions in the document image corrected as shown in FIG. 16. After that, the corrected image generating unit 5i ends the operation.

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The image processing apparatus 1 in a standalone mode is explained as an example. However, processing may be performed depending on a request from a client terminal constructed in a housing different from the housing of the image processing apparatus 1, and the processing result may be returned to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image processing apparatus 1 are merely conceptual and may not necessarily physically resemble the structures shown in the drawings. For instance, the apparatus need not necessarily have the structure that is illustrated.

For example, the process functions performed by each device of the image processing apparatus 1, especially the each process function performed by the control unit, can be entirely or partially realized by a central processing unit 6 (CPU) and a computer program executed by the CPU 6 or by a hardware using wired logic. The computer program, recorded on a recording medium to be described later, can be mechanically read by the image processing apparatus 1 as the situation demands. In other words, the storage unit such as read-only memory (ROM) or hard disk (HD) stores the computer program that can work in coordination with the operating system (OS) to issue commands to the CPU 6 and cause the CPU 6 to perform various processes. The computer program is first loaded to the random access memory (RAM), and forms a control unit in collaboration with the CPU 6.

Alternatively, the computer program can be stored in any application program server connected to the image processing apparatus 1 via the network, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage units are fixed disk devices such as RAM, ROM, and hard disk or flexible disk, optical disk, and store therein various programs, tables, databases, and files required for various processes.

The image processing apparatus 1 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

With this structure according to the present invention, distortion corrections can be more efficiently performed on image pickup objects, and the portability and versatility can be made higher than the portability and versatility achieved with a conventional structure. More specifically, image processing conventionally needs to be performed on both images picked up from above and a side. According to the present invention, on the other hand, a corrected image having distortions corrected can be generated by performing image processing only on an image picked up from above. As a result, distortion correction can be performed with the smaller workload and higher efficiency than a conventional technique. Also, the height distribution and the degrees of curvature of documents are conventionally measured with the use of a stationary device that is an optical system (such as an image pickup unit, an AF mechanism, or a curvature sensor board), before a corrected image having distortions of the document corrected is generated. As a result, conventional devices have become large in size. According to the present invention, however, distorted image corrections can be performed on images picked up with a portable, small-sized image photographing unit (such as a portable-phone-mounted camera formed with a two-dimensional image sensor). Thus, the portability and versatility can be made higher according to the present invention than according to a conventional technique.

With this structure according to the present invention, the distortion position detecting operation can be performed with higher efficiency at a higher speed. More specifically, the rectangle having the minimum area to surround the contour is further divided into four quadrants, so as to narrow the distortion position detecting range. Also, even when a large number of straight line portions exist as possible distortion positions on the contour, the contour straight lines crossing the facing adjacent sides of the rectangle are detected from the straight line portions. In this manner, the possible distortion positions are narrowed down. Among the narrowed-down possible distortion positions, the contour straight line located at a position where the distance between the first intersection and the center point is smallest can be detected as a distortion position.

With this structure according to the present invention, the correction reference line can be efficiently determined from the distortion position, and a corrected image can be generated by aligning the distortions with the correction reference line. More specifically, correction reference points can be readily determined from the coordinates of the contour straight line at the distortion position detected by the distortion position detecting operation. Also, the correction reference line to be the reference for correcting distorted document images can be determined from the correction reference points. The coordinates (the longitude and latitude lines) of each pixel in the distorted document portion surrounded by the contour are estimated so as to expand the distorted document image on a plane, with the degree of distortion of the document being taken into consideration.

With this structure according to the present invention, the correcting operation can be performed based on the contour, after a check is made to determine whether the contour has been accurately extracted. Accordingly, the accuracy of the distortion image correction can be made higher than the accuracy achieved with a conventional structure. More specifically, even when a contour is not accurately extracted due to a fluctuation of the luminance at the time of document image acquirement, an approximate contour can be formed by setting three or more representative points on the extracted contour and performing a cubic spline interpolation or the like. If there is a large difference between the approximate contour and the extracted contour, the positions of the representative points are corrected manually, and the correcting operation can be performed with the use of the approximate contour formed with the corrected representative points.

With this arrangement according to the present invention, the stapled position at which the document is bound with a stapler or the like can be efficiently detected by performing image processing only on an image picked up from above.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
    an image photographing unit configured to photograph a document; and
    a control unit including
        a document image acquiring unit configured to acquire a document image including at least an image of the document photographed by the image photographing unit,
        a contour extracting unit configured to extract, based on luminance of the document image, a contour of the document from the document image acquired by the document image acquiring unit,
        a distortion position detecting unit configured to detect a contour straight line located at a location where a distance between the contour extracted by the contour extracting unit and a center point of a rectangle having the minimum area surrounding the contour is shortest, the contour straight line being detected as a distortion position of a distortion in the document image, the contour straight line being located on the contour, the distance being on a diagonal line of the rectangle, and
        a corrected image generating unit configured to perform geometric correction on the document image to extend the contour to a correction reference line determined from the distortion position detected by the distortion position detecting unit, and generate a corrected image having the distortion in the document image corrected.

2. The image processing apparatus according to claim 1, wherein
    the distortion position detecting unit includes:
        a rectangle forming unit configured to form the rectangle having the minimum area surrounding the contour extracted by the contour extracting unit;
        a contour straight line detecting unit configured to divide the rectangle formed by the rectangle forming unit into four quadrants, detect a straight line portion on the contour from the respective quadrants, and detect the contour straight line that crosses a neighboring side of the rectangle from the straight line portion;

a diagonal intersection detecting unit configured to detect a first intersection of a diagonal line of the rectangle with the contour straight line detected by the contour straight line detecting unit;

a distance calculating unit configured to calculate a distance between the center point of the rectangle and the first intersection detected by the diagonal intersection detecting unit, based on coordinates of the rectangle and the center point; and a distance straight line selecting unit configured to select a distance straight line having the shortest distance calculated by the distance calculating unit among the quadrants, and the distortion position detecting unit is configured to detect the contour straight line crossing the distance straight line selected by the distance straight line selecting unit at the first intersection, the contour straight line being detected as the distortion position of the document image.

3. The image processing apparatus according to claim 2, wherein the corrected image generating unit includes:

a contour curve intersection detecting unit configured to detect two intersections of the contour straight line detected as the distortion position by the distortion position detecting unit with contour curves adjacent to the contour straight line on the contour, the two intersections including a second intersection and a third intersection;

a correction reference point determining unit configured to determine a first correction reference point positioned on a first side of the rectangle on the same Y-coordinate as the second intersection, and a second correction reference point positioned on a second side of the rectangle on the same X-coordinate as the third intersection;

a correction reference line determining unit configured to determine the correction reference line that is formed with (i) a third side connecting the first correction reference point and the second correction reference point determined by the correction reference point determining unit, and (ii) the sides of the rectangle other than the corner portion of the rectangle separated by the third side;

a longitude and latitude estimating unit configured to estimate distorted longitude and latitude lines in a document portion surrounded by the contour, based on coordinates of the correction reference line determined by the correction reference line determining unit, coordinates of the contour extracted by the contour extracting unit, and coordinates of each pixel in the corrected image estimated from the coordinates of the correction reference line;

a document image pixel coordinate acquiring unit configured to acquire coordinates of each pixel in the document image corresponding to the coordinates of each pixel in the corrected image, based on coordinates of the distorted longitude and latitude lines estimated by the longitude and latitude estimating unit, the coordinates of the contour extracted by the contour extracting unit, the coordinates of the correction reference line determined by the correction reference line determining unit, and the coordinates of each pixel in the corrected image estimated from the coordinates of the correction reference line; and a corrected image pixel coordinate determining unit configured to interpolate the coordinates of each pixel in the document image acquired by the document image pixel coordinate acquiring unit, and determine the coordinates of each pixel in the corrected image by linearizing and aligning the longitude line, the latitude line, and the contour with the correction reference line, and the corrected image generating unit is configured to generate the corrected image having the distortion in the document image corrected, using the coordinates of each pixel in the corrected image determined by the corrected image pixel coordinate determining unit.

4. The image processing apparatus according to claim 1, wherein the control unit further includes:

an approximate contour forming unit configured to form an approximate contour by extracting at least three representative points from the contour extracted by the contour extracting unit, and calculating points other than the representative points through a spline interpolation with the use of the representative points; and a contour verifying unit configured to determine whether a difference between the approximate contour formed by the approximate contour forming unit and the contour extracted by the contour extracting unit is greater than a predetermined threshold value, to verify that the contour extracting unit accurately extracts the contour.

5. The image processing apparatus according to claim 4, wherein the distortion position detecting unit is configured to detect the contour straight line as the distortion position of the document image located at a position where the distance between the contour and the center point of the rectangle having the minimum area surrounding the verified contour is shortest, when the contour verifying unit determines that the difference is smaller than the predetermined threshold value and verifies that the contour extracting unit accurately extracts the contour.

6. The image processing apparatus according to claim 5, wherein the distortion position includes a bound position when the document is bound with a binding tool.

7. An image processing method executed by an image processing apparatus including an image photographing unit and a control unit, the image processing method comprising:

a document image acquiring step of acquiring a document image including at least an image of a document photographed by the image photographing unit;

a contour extracting step of extracting, based on luminance of the document image, a contour of the document from the document image acquired at the document image acquiring step;

a distortion position detecting step of detecting a contour straight line located at a location where a distance between the contour extracted at the contour extracting step and a center point of a rectangle having the minimum area surrounding the contour is shortest, the contour straight line being detected as a distortion position of a distortion in the document image, the contour straight line being located on the contour, the distance being on a diagonal line of the rectangle; and a corrected image generating step of performing a geometric correction on the document image to extend the contour to a correction reference line determined from the distortion position detected at the distortion position detecting step, and generating a corrected image having the distortion in the document image corrected, wherein the steps are executed by the control unit.

8. The image processing method according to claim 7, wherein
the distortion position detecting step includes:
a rectangle forming step of forming the rectangle having the minimum area surrounding the contour extracted at the contour extracting step;
a contour straight line detecting step of dividing the rectangle formed at the rectangle forming step into four quadrants, detecting a straight line portion on the contour from the respective quadrants, and detecting the contour straight line that crosses a neighboring side of the rectangle from the straight line portion;
a diagonal intersection detecting step of detecting a first intersection of a diagonal line of the rectangle with the contour straight line detected from the quadrants at the contour straight line detecting step;
a distance calculating step of calculating a distance between the center point of the rectangle and the first intersection detected from the quadrants at the diagonal intersection detecting step, based on coordinates of the rectangle and the center point; and
a distance straight line selecting step of selecting a distance straight line having the shortest distance calculated at the distance calculating step among the quadrants, and
at the distortion position detecting step, the contour straight line crossing the distance straight line selected at the distance straight line selecting step at the first intersection is detected as the distortion position of the document image.

9. The image processing method according to claim 8, wherein
the corrected image generating step includes:
a contour curve intersection detecting step of detecting two intersections of the contour straight line detected as the distortion position at the distortion position detecting step with contour curves adjacent to the contour straight line on the contour, the two intersections including a second intersection and a third intersection;
a correction reference point determining step of determining a first correction reference point positioned on a first side of the rectangle on the same Y-coordinate as the second intersection, and a second correction reference point positioned on a second side of the rectangle on the same X-coordinate as the third intersection;
a correction reference line determining step of determining the correction reference line that is formed with (i) a third side connecting the first correction reference point and the second correction reference point determined at the correction reference point determining step, and (ii) the sides of the rectangle other than the corner portion of the rectangle separated by the third side;
a longitude and latitude estimating step of estimating distorted longitude and latitude lines in a document portion surrounded by the contour, based on coordinates of the correction reference line determined at the correction reference line determining step, coordinates of the contour extracted at the contour extracting step, and coordinates of each pixel in the corrected image estimated from the coordinates of the correction reference line;
a document image pixel coordinate acquiring step of acquiring coordinates of each pixel in the document image corresponding to the coordinates of each pixel in the corrected image, based on coordinates of the distorted longitude and latitude lines estimated at the longitude and latitude estimating step, the coordinates of the contour extracted at the contour extracting step, the coordinates of the correction reference line determined at the correction reference line determining step, and the coordinates of each pixel in the corrected image estimated from the coordinates of the correction reference line; and
a corrected image pixel coordinate determining step of interpolating the coordinates of each pixel in the document image acquired at the document image pixel coordinate acquiring step, and determining the coordinates of each pixel in the corrected image by linearizing and aligning the longitude line, the latitude line, and the contour with the correction reference line, and
at the corrected image generating step, the corrected image having the distortion in the document image corrected is generated by using the coordinates of each pixel in the corrected image determined at the corrected image pixel coordinate determining step.

10. The image processing method according to claim 7, further comprising:
an approximate contour forming step of forming an approximate contour by extracting at least three representative points from the contour extracted at the contour extracting step, and calculating points other than the representative points through a spline interpolation with the use of the representative points; and
a contour verifying step of determining whether a difference between the approximate contour formed at the approximate contour forming step and the contour extracted at the contour extracting step is greater than a predetermined threshold value, to verify that the contour is accurately extracted at the contour extracting step.

11. The image processing method according to claim 10, wherein at the distortion position detecting step, the contour straight line is detected as the distortion position of the document image, the contour straight line being located at a position where the distance between the contour and the center point of the rectangle having the minimum area surrounding the verified contour is shortest, when that the difference is smaller than the predetermined threshold value is determined at the contour verifying step, and when that the contour is accurately extracted at the contour extracting step is verified at the contour verifying step.

12. The image processing method according to claim 11, wherein the distortion position includes a bound position when the document is bound with a binding tool.

* * * * *